US012235792B2

(12) United States Patent
Dai et al.

(10) Patent No.: US 12,235,792 B2
(45) Date of Patent: Feb. 25, 2025

(54) APPARATUS AND METHOD FOR TEMPERATURE-CONSTRAINED FREQUENCY CONTROL AND SCHEDULING

(71) Applicant: Intel Corporation, Santa Clara, CA (US)

(72) Inventors: Jianwei Dai, Portland, OR (US); Somvir Singh Dahiya, Hillsboro, OR (US); Mahesh Kumar P, Bangalore (IN); Stephen H. Gunther, Beaverton, OR (US); Sapumal Wijeratne, Portland, OR (US); Mark Gallina, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/128,852

(22) Filed: Mar. 30, 2023

(65) Prior Publication Data

US 2024/0330234 A1 Oct. 3, 2024

(51) Int. Cl.
*G06F 9/50* (2006.01)
*G06F 1/324* (2019.01)
(Continued)

(52) U.S. Cl.
CPC .......... *G06F 15/7814* (2013.01); *G06F 1/324* (2013.01); *G06F 9/4893* (2013.01); *G06F 9/5044* (2013.01); *G06F 9/505* (2013.01)

(58) Field of Classification Search
CPC ...... G06F 9/4893; G06F 9/505; G06F 9/5044; G06F 1/324
See application file for complete search history.

(56) References Cited

U.S. PATENT DOCUMENTS 10,289,191 B2   5/2019  Williamson et al.
2011/0173463 A1  7/2011  Gargash et al.
(Continued)

FOREIGN PATENT DOCUMENTS

WO   2014/070338 A1   5/2014

OTHER PUBLICATIONS

Corbet Jonathan, Dominic Brodowski: "linux/Documentation/cpu-freq/ governors.txt at v4.9 . torvalds/linux . GitHub", Linux Kernel Documentation, available online at <https://github.com/torvalds/linux/blob/v4.9/Documentation/cpu-freq/governors.txt>, Jun. 5, 2015, pp. 1-4.

(Continued)

*Primary Examiner* — Jacob Petranek
(74) *Attorney, Agent, or Firm* — Nicholson De Vos Webster & Elliott LLP

(57) ABSTRACT

An apparatus and method for temperature-constrained frequency control and scheduling. For example, one embodiment of a processor comprises: a plurality of cores; power management circuitry to control a frequency of each core of the plurality of cores based, at least in part, on a temperature associated with one or more cores of the plurality of cores, the power management circuitry comprising: a temperature limit-driven frequency controller to determine a first frequency limit value based on a temperature of a corresponding core reaching a first threshold; frequency prediction hardware logic to predict a temperature-constrained frequency of the corresponding core based on the first frequency limit value and an initial frequency limit value; and performance determination hardware logic to determine a new performance value for the corresponding core based on the temperature-constrained frequency, the new performance value to be provided to a task scheduler.

24 Claims, 18 Drawing Sheets

(51) Int. Cl.
*G06F 9/48* (2006.01)
*G06F 15/78* (2006.01)

(56) References Cited

U.S. PATENT DOCUMENTS

| | | | |
|---|---|---|---|
| 2012/0117403 A1* | 5/2012 | Bieswanger | G06F 1/324 |
| | | | 713/322 |
| 2012/0185709 A1 | 7/2012 | Weissmann et al. | |
| 2013/0047166 A1* | 2/2013 | Penzes | H03L 7/0802 |
| | | | 718/105 |
| 2016/0019130 A1* | 1/2016 | Kruglick | G06F 11/2033 |
| | | | 702/182 |
| 2018/0060085 A1 | 3/2018 | Ananthakrishnan et al. | |
| 2018/0088985 A1 | 3/2018 | Blaine et al. | |
| 2018/0301119 A1 | 10/2018 | Koker et al. | |
| 2018/0349191 A1 | 12/2018 | Dorsey et al. | |
| 2020/0356156 A1* | 11/2020 | Karhu | G06F 11/3024 |
| 2021/0026708 A1 | 1/2021 | Weissmann et al. | |
| 2021/0064426 A1 | 3/2021 | Gupta et al. | |
| 2021/0081027 A1 | 3/2021 | Park et al. | |
| 2021/0405112 A1* | 12/2021 | Partiwala | G06F 11/3024 |
| 2023/0205286 A1* | 6/2023 | Hu | G06F 11/30 |
| | | | 713/300 |
| 2023/0205539 A1* | 6/2023 | Blagodurov | G06N 3/08 |
| | | | 712/239 |
| 2024/0077928 A1* | 3/2024 | Pimparkar | G06F 1/324 |

OTHER PUBLICATIONS

Extended European search report, EP App. No. 23210237.6, Apr. 29, 2024, 15 pages.
Haris et al., "Design and Implementation of aNew CPU Governor—Power Aware Governor", Jul. 16, 2014, 9 pages.
International Search Report and Written Opinion, PCT App. No. PCT/US2023/086321, Apr. 24, 2024, 08 pages.
Larabel Michael, "Linux 4.7 CPUFreg Schedutil Testing vs. P-State—Phoronix", available online at <https://www.phoronix.com/review/linux-47-schedutil/2>, May 21, 2016, 1 page.
Extended European search report, EP App. No. 23213908.9, May 8, 2024, 07 pages.

* cited by examiner

| STAGE 1201 | FEATURE 1202 | WLT SUB-CONDITION 1203 | SOC DIE BIASING 1204 | FEATURE CONDITION MET 1205 | FEATURE CONDITION NOT MET 1206 | TYPE OF ACTION 1207 |
|---|---|---|---|---|---|---|
| 0 | Priority Mailbox (e.g., overclocking & other software) | NA | NA | NA | 0 Cores Active – Security DoS Error: Ignore and Use Last Command | Parking (Thread Specific) |
| 1 | WLT & SoC Die Biasing | No Inference | Yes | Apply & Next Stage | NA | Containment (Core Specific) |
|   |   | Bursty/Sustain | No | Skip Stage | NA | NA |
|   |   | Bursty/Sustain | NA | Apply & Next Stage | Skip Stage | BU/SU : Parking (Core Specific) |
|   |   | BL/IDLE | No | Apply & Next Stage | Num Core Count Not Met – Skip Stage | BL/ID : Containment |
|   |   | BL/IDLE | Yes | Apply & Next Stage | NA | BL/ID : Containment |
| 2 | Below PE Consolidation | Bursty/Sustain /No Inference | NA | Apply & Next Stage | Skip Stage | BU/SU : Parking (Core-Class Specific) |
|   |   | BL/IDLE | NA | Apply & Next Stage | Skip Stage | BL/ID : Containment (Core-Class Specific) |
| 3 | Survivability | NA | NA | Apply & Replace "Uncontained" with "Park" | Override (fixed default SoC die) | Parking (Core Specific) |
| 4 | Specific Core Selection Criteria – Dynamic Parking/Containment | If BURSTY/SUSTAIN : Sort by Highest Perf -- from Bottom most (Dynamic Sorting based on fields in guide unit) If BL/IDLE/NA : Sort by Highest Efficiency - Contain from Top Most (Dynamic Sorting based on fields in guide unit) If Survivability: Park Highest Power : Sort by Highest Perf and Park from Top Most (Dynamic Sorting based on fields in guide unit) | | | | |

Fig. 12

LP Capabilities Table(s) 1340

| Global | EE3_CH | PERF3_CH | EE2_CH | PERF2_CH | EE1_CH | PERF1_CH | EE0_CH | PERF0_CH |
|---|---|---|---|---|---|---|---|---|
| LP0 | EE3 | PERF3 | EE2 | PERF2 | EE1 | PERF1 | EE0 | PERF0 |
| LP1 | EE3 | PERF3 | EE2 | PERF2 | EE1 | PERF1 | EE0 | PERF0 |
| LP2 | EE3 | PERF3 | EE2 | PERF2 | EE1 | PERF1 | EE0 | PERF0 |
| LP3 | EE3 | PERF3 | EE2 | PERF2 | EE1 | PERF1 | EE0 | PERF0 |
| LP4 | EE3 | PERF3 | EE2 | PERF2 | EE1 | PERF1 | EE0 | PERF0 |
| LP5 | EE3 | PERF3 | EE2 | PERF2 | EE1 | PERF1 | EE0 | PERF0 |
| LP6 | EE3 | PERF3 | EE2 | PERF2 | EE1 | PERF1 | EE0 | PERF0 |
| LP7 | EE3 | PERF3 | EE2 | PERF2 | EE1 | PERF1 | EE0 | PERF0 |
| LP8 | EE3 | PERF3 | EE2 | PERF2 | EE1 | PERF1 | EE0 | PERF0 |
| LP9 | EE3 | PERF3 | EE2 | PERF2 | EE1 | PERF1 | EE0 | PERF0 |
|  | Class 3 | | Class 2 | | Class 1 | | Class 0 | |

Class Coding 1401

| ENCODING | Class 0 | Class 1 | Class 2 | Class 3 |
|---|---|---|---|---|
| 0 | Perf/EE from Guide Unit | Perf/EE from Guide Unit | Perf/EE from Guide Unit | Perf/WEE from Guide Unit |
| 1 | EE=255 for Contained Cores | Perf/EE from Guide Unit | Perf/EE from Guide Unit | EE=255 for Contained Cores |
| 2 | EE=Perf=00 | EE=Perf=00 | EE=Perf=00 | EE=Perf=00 |
| 3 | EE=Perf=00 | Perf/EE from Guide Unit | Perf/EE from Guide Unit | EE=Perf=00 |

Inputs: MB 1302, HGS Perf/EE 854, Dynamic Core Config 1345, Park/Contain LP Data

*Fig. 14*

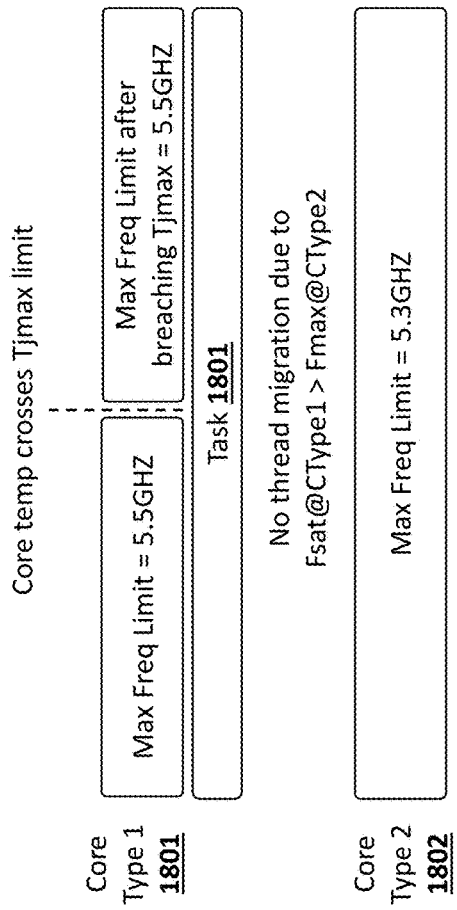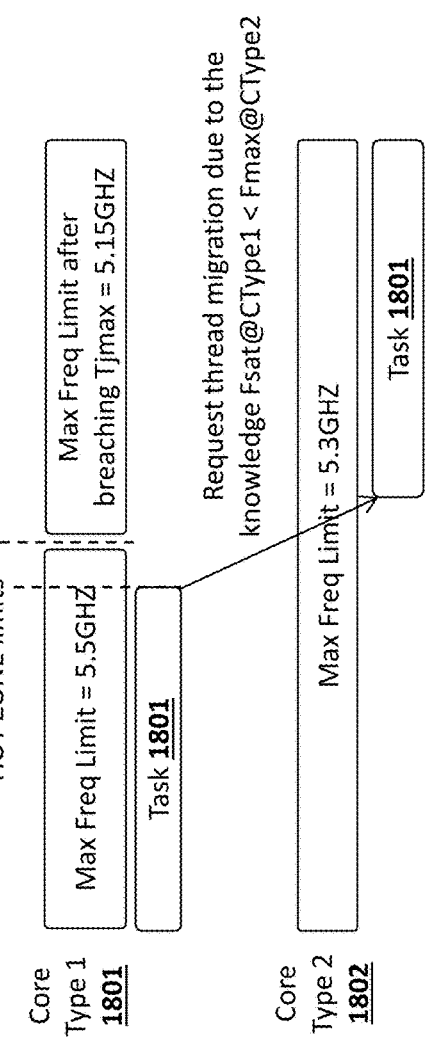
*Fig. 18A*
*Fig. 18B*

APPARATUS AND METHOD FOR TEMPERATURE-CONSTRAINED FREQUENCY CONTROL AND SCHEDULING

BACKGROUND

Field of the Invention

The embodiments of the invention relate generally to the field of computer processors. More particularly, the embodiments relate to an apparatus and method for temperature-constrained frequency control and scheduling.

Description of the Related Art

With hybrid processor architectures, scheduling is a critical for compute performance. Existing scheduling techniques deliver reasonable performance on highly threaded, high load applications. In a processor such as a system-on-chip (SoC) with homogenous cores, temperature information collected by the processor can be exploited to optimize performance because cooler cores can generally achieve improved performance over warmer cores from the perspective of temperature constraints. However, for SoCs with hybrid processor cores, considering only core temperatures to decide which core can provide the best performance can lead to incorrect and inefficient decisions.

BRIEF DESCRIPTION OF THE DRAWINGS

A better understanding of the present invention can be obtained from the following detailed description in conjunction with the following drawings, in which:

FIG. 12 illustrates a plurality of power management stages for rendering power management decisions in accordance with some implementations;

FIG. 14 illustrates class coding and an associated power management process in accordance with some embodiments;

FIGS. 18A-B illustrate task scheduling operations associated with different core types in accordance with some embodiments.

DETAILED DESCRIPTION

Figure 1:
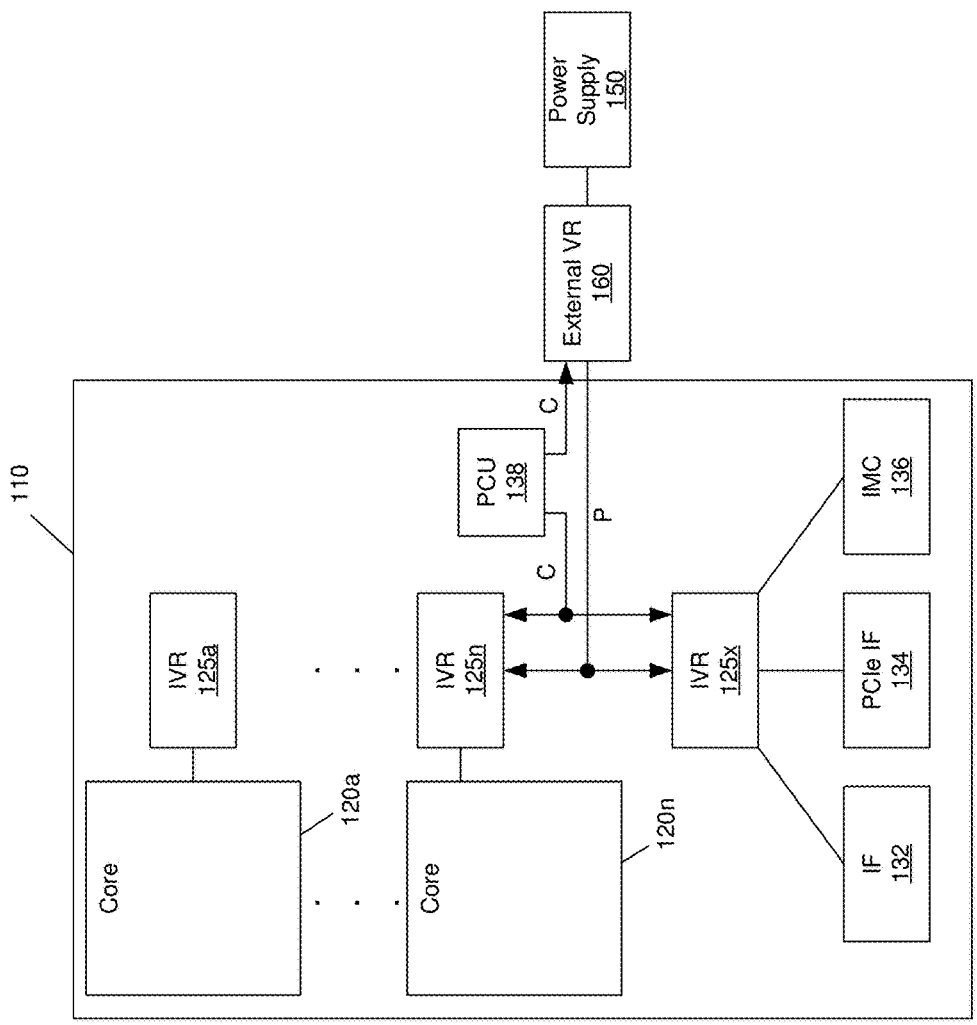
FIG. 1 is a block diagram of a portion of a system in accordance with an embodiment of the present invention.

In various embodiments, techniques are provided for managing power and thermal consumption in a heterogeneous (hetero) processor. As used herein the term "hetero processor" refers to a processor including multiple different types of processing engines. For example, a hetero processor may include two or more types of cores that have different microarchitectures, instruction set architectures (ISAs), voltage/frequency (VF) curves, and/or more broadly power/performance characteristics.

Optimal design/operating point of a heterogeneous processor (in terms of VF characteristics, instructions per cycle (IPC), functionality/ISA, etc.) is dependent on both inherent/static system constraints (e.g., common voltage rail) and a dynamic execution state (e.g., type of workload demand, power/thermal state, etc.). To extract power efficiency and performance from such architectures, embodiments provide techniques to determine/estimate present hardware state/capabilities and to map application software requirements to hardware blocks. With varying power/thermal state of a system, the relative power/performance characteristics of different cores change. Embodiments take these differences into account to make both local and globally optimal decisions. As a result, embodiments provide dynamic feedback of per core power/performance characteristics.

More specifically, embodiments provide closed loop control of resource allocation (e.g., power budget) and operating point selection based on the present state of heterogeneous hardware blocks. In embodiments, a hardware guided scheduling (HGS) interface is provided to communicate dynamic processor capabilities to an operating system (OS) based on power/thermal constraints. Embodiments may dynamically compute hardware (HW) feedback information, including dynamically estimating processor performance and energy efficiency capabilities. As one particular example, a lookup table (LUT) may be accessed based on underlying power and performance (PnP) characteristics of different core types and/or post-silicon tuning based on power/performance bias.

In addition, embodiments may determine an optimal operating point for the heterogeneous processor. Such optimal operating point may be determined based at least in part on a present execution scenario, including varying workload demands (performance, efficiency, responsiveness, throughput, IO response) of different applications, and shifting performance and energy efficiency capabilities of heterogeneous cores.

In embodiments, the dynamically computed processor performance and energy efficiency capabilities may be provided to an OS scheduler. The feedback information takes into account power and thermal constraints to ensure that current hardware state is provided. In this way, an OS scheduler can make scheduling decisions that improve overall system performance and efficiency. Note that this feedback is not dependent on workload energy performance preference (EPP) or other software input. Rather, it is based on physical constraints that reflect current hardware state.

In contrast, conventional power management mechanisms assume all cores to be of the same type, and thus estimate the maximum achievable frequency on each core to be same for a given power budget. This is not accurate, as different cores may have different power/performance capabilities individually and they may have different maximum frequency based on other platform constraints. And further, conventional power management algorithms assume the same utilization target for all cores when calculating performance state (P-state) and hence do not take into account the heterogeneity of an underlying architecture. Nor do existing techniques optimize the operating points with an objective of mapping a particular type of thread to a core type based on optimizing power or performance.

In general, a HGS interface provides dynamic processor capabilities to the OS based on power/thermal constraints. The OS takes this feedback as an input to a scheduling algorithm and maps workload demand to hetero compute units. The scheduler's mapping decisions may be guided by different metrics such as performance, efficiency or responsiveness, etc. The scheduling decisions in turn impact processor states, hence forming a closed loop dependence. Since workload demand, in terms of power/performance requirements, can vary by large margins, any change in scheduling decisions can cause a large shift in HGS feedback, leading to unacceptable stability issues. Embodiments provide techniques that are independent/resilient of the scheduling decisions or other software inputs from the operating system, and thus avoid these stability issues.

Although the following embodiments are described with reference to specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatuses, methods, and systems described herein are not limited to physical computing devices, but may also relate to software optimizations.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores 120 a-120 n. In addition, each core may be associated with an integrated voltage regulator (IVR) 125 a-125 n which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered.

Still referring to FIG. 1, additional components may be present within the processor including an input/output interface 132, another interface 134, and an integrated memory controller 136. As seen, each of these components may be powered by another integrated voltage regulator 125 x. In one embodiment, interface 132 may be enable operation for an Intel® Quick Path Interconnect (QPI) interconnect, which provides for point-to-point (PtP) links in a cache coherent protocol that includes multiple layers including a physical layer, a link layer and a protocol layer. In turn, interface 134 may communicate via a Peripheral Component Interconnect Express (PCIe™) protocol.

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or management power management source or system software).

In embodiments herein, PCU 138 may be configured to dynamically determine hardware feedback information regarding performance and energy efficiency capabilities of hardware circuits such as cores 120 and provide an interface to enable communication of this information to an OS scheduler, for use in making better scheduling decisions. To this end, PCU 138 may be configured to determine and store such information, either internally to PCU 138 or in another storage of system 100.

Furthermore, while FIG. 1 shows an implementation in which PCU 138 is a separate processing engine (which may be implemented as a microcontroller), understand that in some cases in addition to or instead of a dedicated power controller, each core may include or be associated with a power control agent to more autonomously control power consumption independently. In some cases a hierarchical power management architecture may be provided, with PCU 138 in communication with corresponding power management agents associated with each of cores 120.

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited.

Processors described herein may leverage power management techniques that may be independent of and complementary to an operating system (OS)-based power management (OSPM) mechanism. According to one example OSPM technique, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to one OSPM mechanism, a processor can operate at various power states or levels. With regard to power states, an OSPM mechanism may specify different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, Calif., to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle.

Thread Scheduling Based on Processor Information

Figure 2:
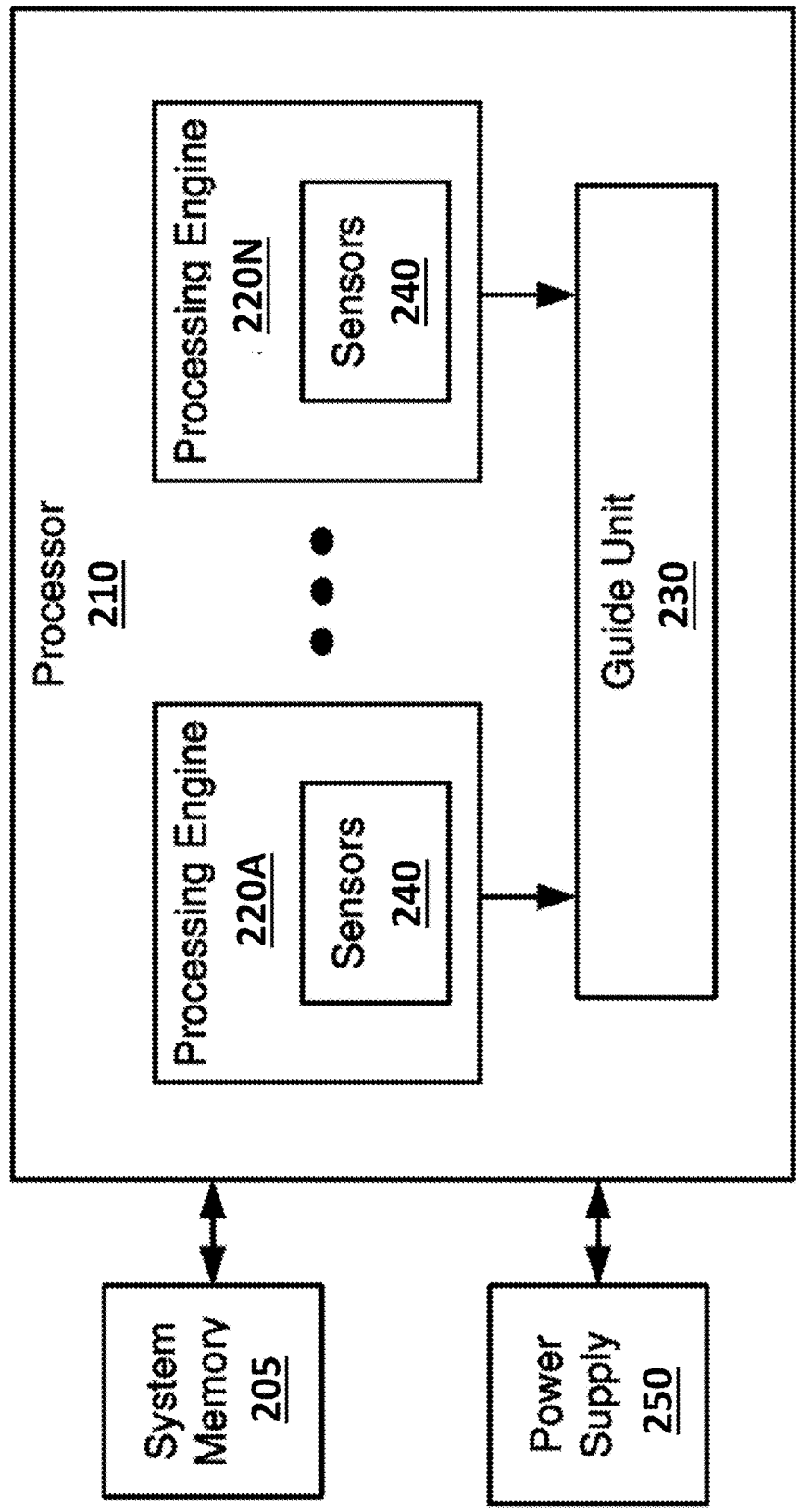
FIG. 2 illustrates one embodiment comprising a hardware guide unit.

Referring now to FIG. 2, shown is a block diagram of a system 200 in accordance with one or more embodiments. In some embodiments, the system 200 may be all or a portion of an electronic device or component. For example, the system 200 may be a cellular telephone, a computer, a server, a network device, a system on a chip (SoC), a controller, a wireless transceiver, a power supply unit, etc. Furthermore, in some embodiments, the system 200 may be part of a grouping of related or interconnected devices, such as a datacenter, a computing cluster, etc.

As shown in FIG. 2, the system 200 may include a processor 210 operatively coupled to system memory 205 and a power supply 250. Further, although not shown in FIG. 2, the system 200 may include other components. In one or more embodiments, the system memory 205 can be implemented with any type(s) of computer memory (e.g., dynamic random-access memory (DRAM), static random-access memory (SRAM), non-volatile memory (NVM), a combination of DRAM and NVM, etc.). The power supply 250 may provide electrical power to the processor 210.

In one or more embodiments, the processor 210 may be a hardware processing device (e.g., a central processing unit (CPU), a System on a Chip (SoC), and so forth). As shown, the processor 210 can include any number of processing engines 220A-220N (also referred to generally as processing engines 220) and a guide unit 230. Each processing engine 220 can include one or more sensors 240 to provide measurements regarding the processing engine 220 to the guide unit 230. For example, the sensors 240 may provide measurements regarding processing engine performance, efficiency, power usage, temperature, reliability, thread execution, and so forth.

In one or more embodiments, the guide unit 230 may be a hardware component of the processor 210 to provide processing engine information to guide a thread scheduler (not shown). In some embodiments, the processing engine information may include one or more rankings of processing engines (e.g., thread agnostic rankings, thread specific rankings, and so forth). Further, in some embodiments, the processing engine information may include one or more predicted characteristics of a processing engine. Various aspects of the guide unit 230 are described below.

Figure 3:
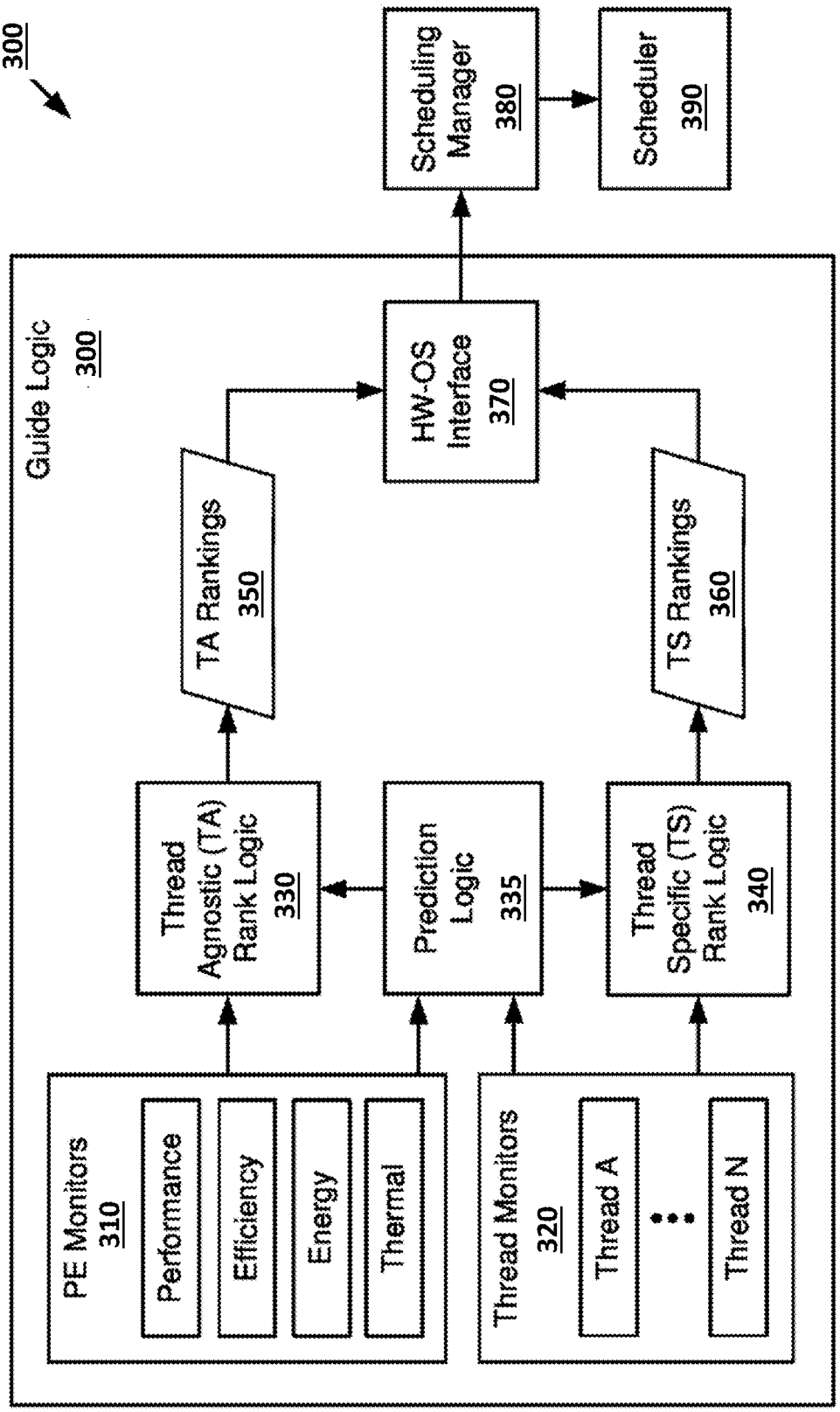
FIG. 3 illustrate details for one embodiment of a guide unit.

Referring to FIG. 3, shown is a diagram of an example system 305, in accordance with one or more embodiments. The system 305 may include guide logic 300, a scheduling manager 380, and a scheduler 390. The guide logic 300 may correspond generally to some or all of the guide unit 230 (shown in FIG. 2). In some embodiments, the guide logic 300 may be implemented at least in part using hardware.

As shown in FIG. 3, the guide logic 300 may include processing engine (PE) monitors 310, thread monitors 320, thread agnostic (TA) rank logic 330, prediction logic 335, thread specific (TS) rank logic 340, and a hardware-operating system (HW-OS) interface 370. As used herein, "thread agnostic rank" refers to a rank that is independent from any particular thread or workload type. For example, some workload types may include compute-intensive (e.g., PE resources required), memory-intensive (e.g., memory controller bandwidth required), highly-parallelized (e.g., graphics processing resources required), accelerated (e.g., accelerator resources required), and so forth. In some embodiments, a single thread may be characterized as one or more workload types depending the instructions included in an instruction sequence.

In one or more embodiments, the PE monitors 310 may monitor characteristics of each PE without regard to a specific workload or thread. The monitored characteristics of each PE may include performance, efficiency, energy use, thermal, and reliability characteristics. For example, the PE monitors 310 may monitor metrics such as instructions per clock cycle, power consumed per time period, percentage of maximum performance, average power state, temperature, percentage of lifecycle that has elapsed, total number of power cycles, maximum power level, and so forth. The PE monitors 310 may be implemented using hardware counters.

In some embodiments, the PE monitors 310 may monitor and/or count system events representing PE execution characteristics (e.g., microarchitecture events, architecture events, system events, etc.). For example, the PE monitors 310 may determine the number of floating point instruction retired, the number of memory instructions retired, the number of branch mispredictions, the number of cache misses, the number of pipeline stalls, and so forth.

In one or more embodiments, the thread monitors 320 may monitor characteristics of individual threads. For example, the thread monitors 320 may monitor metrics such as instructions completed per time period, idle time, and so forth. Further, the thread monitors 320 may determine an execution profile and/or type, such as graphics processing, network processing, floating point calculation, encryption processing, and so forth. The thread monitors 320 may be implemented using hardware counters.

In some embodiments, the prediction logic 335 may use data from the PE monitors 310 and/or the thread monitors 320 to predict the performance of a thread on multiple PEs. For example, assume that a first thread is currently executing on a first PE (e.g., PE 220A shown in FIG. 2) of a processor having multiple PEs. In some embodiments, the prediction logic 335 may analyze characteristics of the first thread, the first PE, and other PEs (e.g., PE 220N shown in FIG. 2) to predict characteristics of the first thread if it were to instead be executed on the other PEs (e.g., if the first thread were moved to a second PE). The predictions performed by the prediction logic 335 are described further below.

Figures 4, 5:
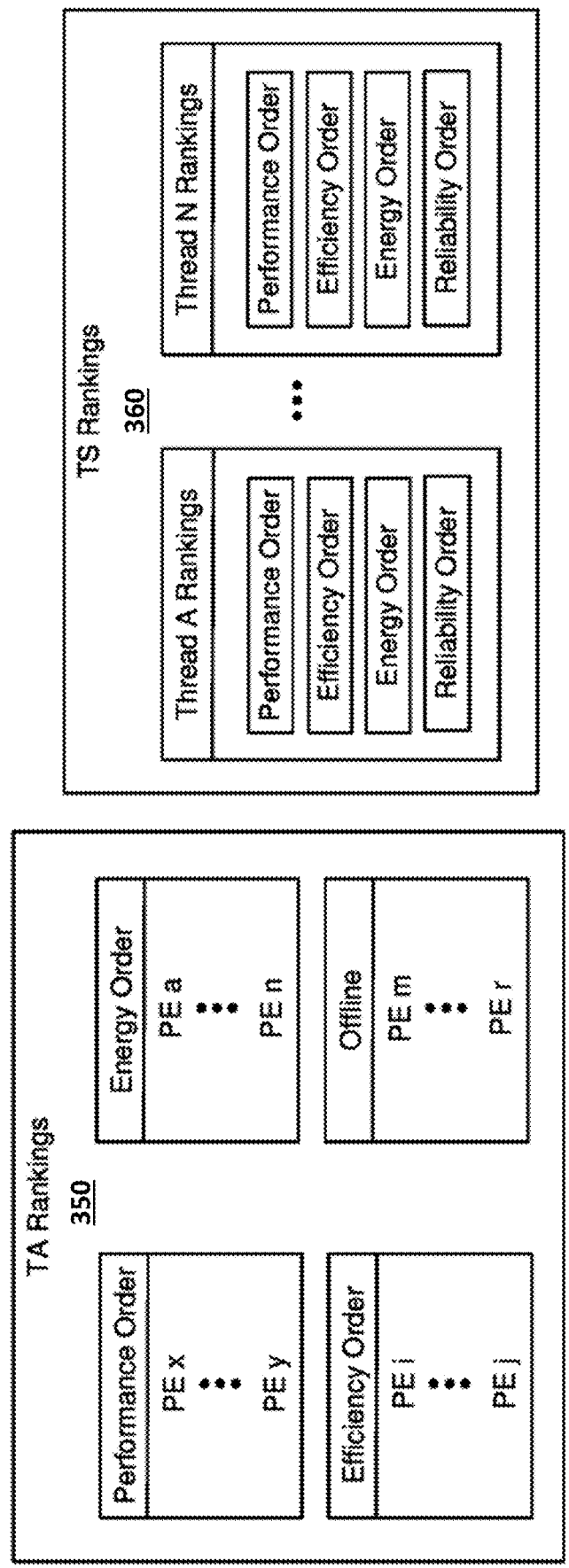
FIG. 4 illustrates thread agnostic rankings in accordance with one embodiment.
FIG. 5 illustrates thread specific rankings in accordance with one embodiment.

In one or more embodiments, the TA rank logic 330 may use data from the PE monitors 310 and/or the prediction logic 335 to generate one or more TA rankings 350. In some embodiments, each TA ranking 350 may include a list of PEs arranged in a particular thread agnostic order. Referring now to FIG. 4, shown is an example set of TA rankings 350, in accordance with some embodiments. Specifically, as shown in FIG. 4, the TA rankings 350 may include a performance order ranking, an efficiency order ranking, an energy order ranking, and an offline order ranking. In some embodiments, the performance order ranking may reflect the relative performance capabilities of the PEs (e.g., from fast processing to slowest processing). The efficiency order ranking may reflect the relative energy efficiency capabilities of the PEs (e.g., from most efficient to least efficient). The energy order ranking may reflect the relative power consumption of the PEs. The offline order ranking may indicate which PEs are to be taken offline, and/or a sequential order of the PEs in which they should be taken offline if necessary. In some embodiments, the TA rankings 350 may be stored in a global processor location or structure. For example, the TA rankings 350 may be stored in registers of a processor (e.g., processor 210 shown in FIG. 2), in external memory (e.g., system memory 205 shown in FIG. 2), and so forth.

Referring again to FIG. 3, the TS rank logic 340 may use data from the thread monitors 320 and/or the prediction logic 335 to generate one or more TS rankings 360. In some embodiments, each TS ranking 360 may be associated with a particular thread, and may include a list of PEs arranged in an order specific to that particular thread. Referring now to FIG. 5, shown is an example set of TS rankings 360, in accordance with some embodiments. For example, the TS rankings 360 may a PE ranking for thread A, a PE ranking for thread B, and so forth. In some embodiments, the TS rankings 360 may be stored in global processor memory structure. For example, the TA rankings 350 may be stored in registers of a processor, in external memory, in a thread context block maintained by the OS, and so forth. In some embodiments, the TS rankings 360 may be generated and/or updated in response to process context switch events.

Referring again to FIG. 3, in some embodiments, the TA rankings 350 and the TS rankings 360 may be provided to the scheduling manager 380 via the hardware (HW)-OS interface 370. In some embodiments, the HW-OS interface 370 may include registers and/or memory structures defined at the PE and/or thread level. Further, the HW-OS interface 370 may include enumeration registers and capabilities that allow the OS to discover and/or identify specific support and definition of PE information provided by the guide logic 300. The HW-OS interface 370 may also support interrupt capabilities to alert the OS about status and/or events of the guide logic 300. In some embodiments, the HW-OS interface 370 includes the hardware feedback interface (HFI) described in detail below.

In one or more embodiments, the scheduling manager 380 and/or the scheduler 390 may implemented in software (e.g., the operating system, a stand-alone application, etc.). The scheduling manager 380 may control the amount and/or format of the TA rankings 350 and TS rankings 360 provided to the scheduler 390. For example, the scheduling manager 380 may sort PE rankings, may filter PE rankings according to criteria (e.g., by age, by PE group, by thread group, by type, and so forth), may combine multiple PE rankings to generate combined PE rankings, may reformat PE rankings, and so forth.

In one or more embodiments, the scheduler 390 may use the TA rankings 350 and/or the TS rankings 360 to allocate threads to PES (e.g., PEs 220 shown in FIG. 2). For example, the scheduler 390 may use PE information to schedule threads based on a current system priority, policy, or state (e.g., a specified balance between performance, efficiency, power consumption, and/or reliability priorities), based on thread specific characteristics (e.g., whether a thread is defined as a foreground task or a background task), to control temperature gradients and/or hot spots in PEs, and so forth.

In some embodiments, the TA rankings 350 and/or the TS rankings 360 may include indications to provide specific guidance to the scheduler 390. For example, a first PE may be assigned a rank value (e.g., "0") to indicate that the first PE is to remain offline and thus should not be assigned any threads. In some embodiments, a PE may be taken offline to improve reliability of the PE, to delay a lifecycle limit of the PE, to remain within a specified power budget, to limit power use during a particular power state, to control temperature gradients and/or hot spots in PEs, and so forth.

In some embodiments, the output of the guide logic 300 may reflect groupings of PEs according to defined criteria. For example, the PEs listed in the TA rankings 350 may be grouped into performance classes (e.g., Class A with performance metric from 0 to 2, Class B with performance metric from 3 to 7, and Class C with performance metric from 8 to 10). Such groupings may allow the scheduler 390 to manage thread allocations by groups rather than by individual PEs.

Figure 6:
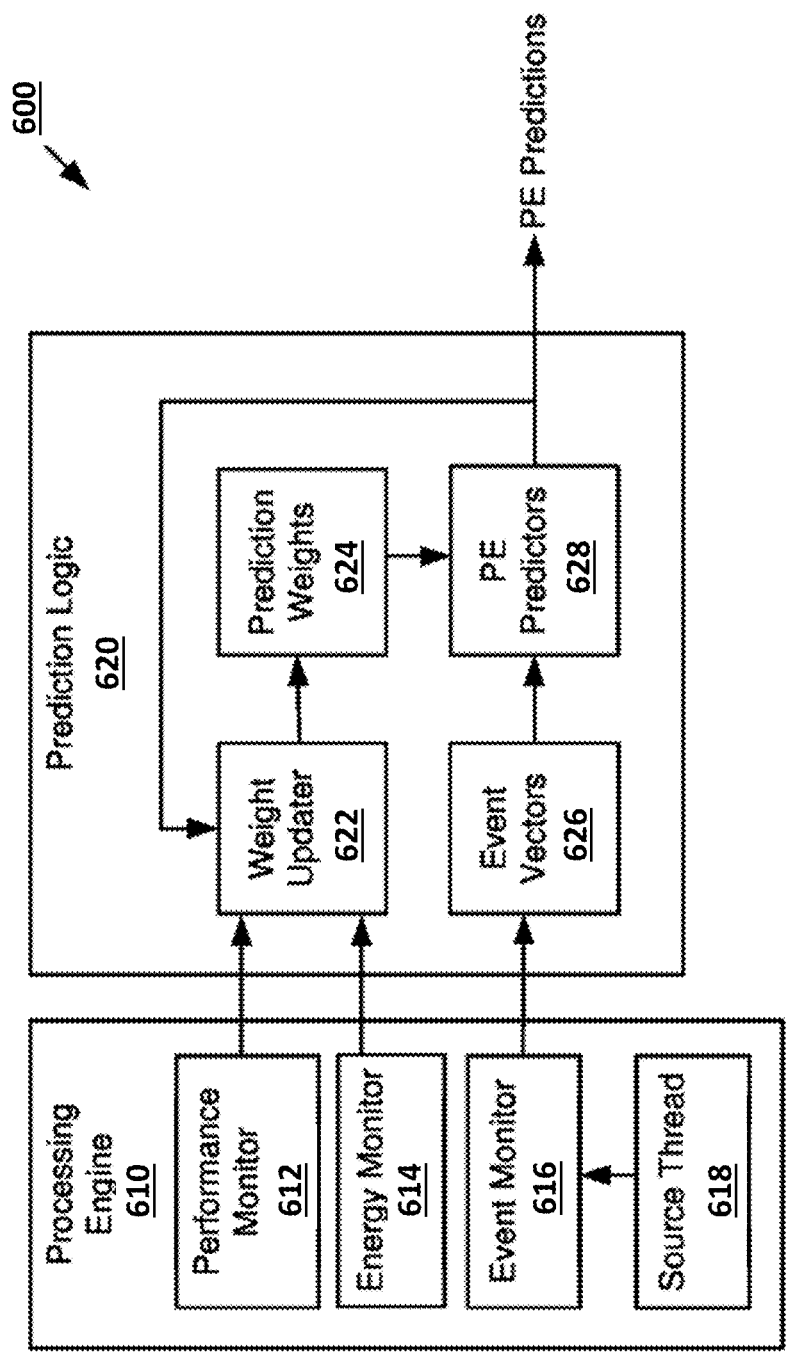
FIG. 6 illustrates one embodiment of a prediction circuit/logic using event vectors and prediction weights.

Referring now to FIG. 6, shown is a diagram of an example system 600 in accordance with one or more embodiments. As shown, the system 600 may include a processing engine (PE) 610 and prediction logic 620. The prediction logic 620 may correspond generally to some or all of the prediction logic 335 shown in FIG. 3A.

In some embodiments, the PE 610 may include a performance monitor 612, an energy monitor 614, and an event monitor 616. Further, the PE 610 may execute a source thread 618. The event monitor 616 may detect events of the PE 610 during execution of the source thread 618, such as memory instruction retirements, floating point instruction retirements, branch mispredictions, cache misses, pipeline stalls, and so forth. The performance monitor 612 may monitor performance characteristics of the PE 610 (e.g., instructions per clock cycle, percentage of maximum performance, etc.). The energy monitor 614 may monitor energy characteristics of the PE 610, such as power consumed per time period, power state, etc. In some embodiments, the performance monitor 612, the energy monitor 614, and/or the event monitor 616 may be implemented using hardware counters.

In one or more embodiments, the prediction logic 620 may include a weight updater 622, prediction weights 624, event vectors 626, and PE predictors 614. In some embodiments, the prediction logic 620 may receive indications of events from the event monitor 616 of PE 610, and may populate the event vectors 626 according to the received indications.

Figures 7A, 7B:
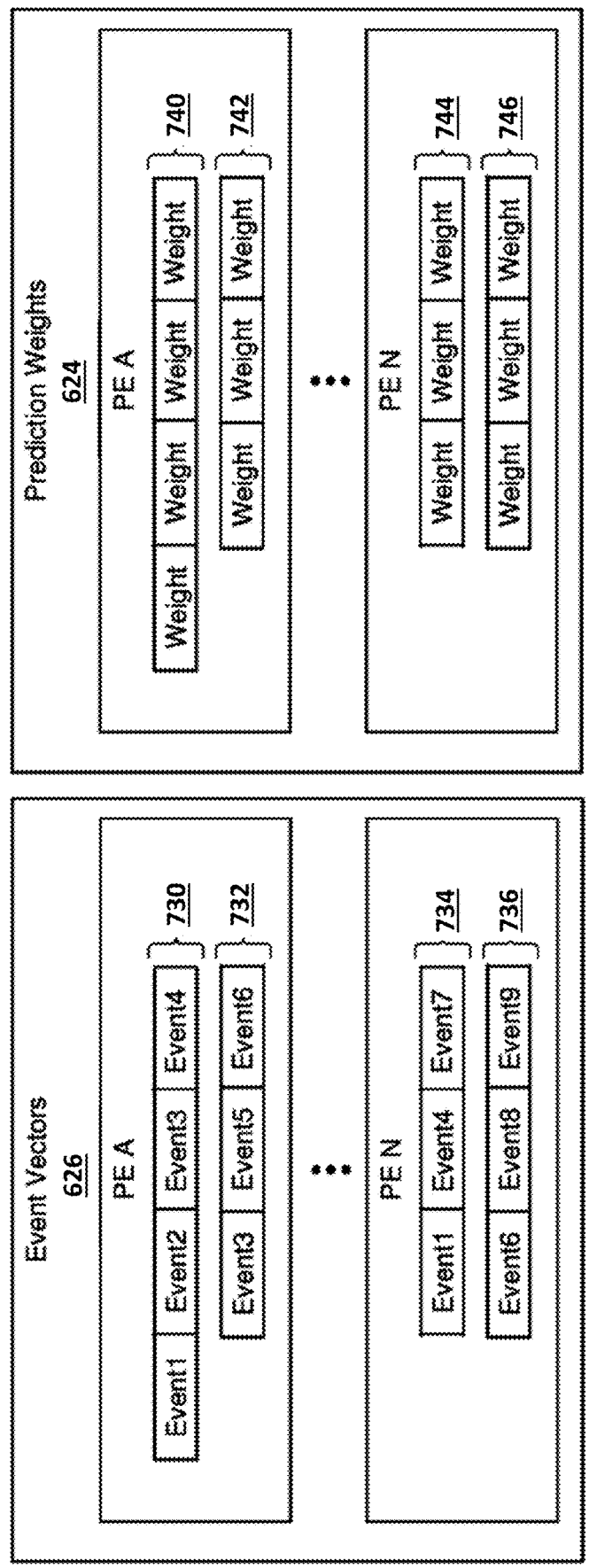
FIG. 7A illustrates event vectors in accordance with some embodiments.
FIG. 7B illustrates prediction weights in accordance with some embodiments.

Referring now to FIG. 7A, shown is an example set of event vectors 626, in accordance with some embodiments (specifically event vectors 730, 732, 734, 736). As shown, the event vectors 626 may include groups of vectors associated with various PEs (i.e., PE A to PE N). In some embodiments, each event vector 626 may include a unique number of fields, with each field being associated with a unique type of event. For example, a group of vectors for PE A may include a performance vector 730 and an energy vector 732. The performance vector 730 may include four fields, with each field indicating the occurrence of a particular event type. For example, a performance vector 730 may include a first field to store a number of memory instruction retirements, a second field to store a number of floating point instruction retirements, and so forth. The energy vector 732 may include three fields, with each field indicating the occurrence of a particular event type.

It is contemplated that the event vectors for different PEs (or different PE types) may include fields for different event types, and may include different numbers of fields. For example, the group of vectors for PE N may include a performance vector 734 with three fields, and an energy vector 734 with three fields.

In some embodiments, the prediction weights 624 may be arranged in vectors 740, 742, 744, 746 similar to the event vectors 626. Referring now to FIG. 7B, shown is an example set of prediction weights 624 in accordance with some embodiments. As shown, the prediction weights 624 may include weight vectors 740, 742 for PE A. The weight vector 740 may include four weight fields that correspond to the performance vector 730. The weight vector 742 may include three weight fields that correspond to the energy vector 732 of PE A. Further, the weight vectors 744, 746 may correspond respectively to the performance vector 734 and energy vector 736 for PE N.

Referring again to FIG. 6, the PE predictors 628 may generate PE predictions for executing the source thread 618 on other PEs. Specifically, the PE predictors 628 may use events in the processing engine 610 (as populated in the event vectors 626) and the prediction weights 624 to predict characteristics of source thread 618 if executed on different PEs (i.e., on PEs other than PE 610). For example, the PE predictors 628 may provide performance predictions, power usage predictions, clock frequency predictions, and so forth. The PE predictors 628 may include linear predictors (e.g., linear regression), non-linear predictors, reinforcement logic models, and so forth.

In one or more embodiment, the PE predictors 628 may use a linear predictor to multiply an event vector 626 by a weight vector of the prediction weights 624, and determine a predicted value based on a sum of the element products. For example, the linear predictor may multiply each element of performance vector 630 of PE A (shown in FIG. 7A) by the corresponding element of weight vector 740 of PE A (shown in FIG. 7B), and may sum the products of all vector elements. The resulting sum may be a predicted performance value for the source thread 618 if it was executed on PE A. In some embodiments, the predicted performance may be provided to a scheduler (e.g., scheduler 390 shown in FIG. 3), and the scheduler may use this information to determine whether to move the source thread 618 to PE A from PE 610.

In one or more embodiment, the PE predictors 628 may provide predictions as to use a linear predictor to multiply an event vector 626 by a weight vector of the prediction weights 624, and determine a predicted value based on a sum of the element products. For example, the linear predictor may multiply each element of performance vector 730 of PE A by the corresponding element of weight vector 740 of PE A, and may sum the products of all vector elements. The resulting sum may be a predicted performance value for the source thread 618 if it was executed on PE A. In some embodiments, the predicted performance may be provided to a scheduler (e.g., scheduler 390), and the scheduler may use this information to determine whether to move the source thread 618 to PE A from PE 610.

In one or more embodiment, the weight updater 622 may compare PE predictions for a given PE to measured values to adjust the prediction weights 624. For example, assume that a scheduler receives predicted performance and energy characteristics for PE A, and then reallocates the source thread 618 to PE A. Assume further that PE A includes a performance monitor 612 and an energy monitor 614 that provide measured performance and energy characteristics for the execution of the source thread 618 on PE A. In this example, the weight updater 622 may compare the predicted and measured characteristics, and may adjust the prediction weights 624 based on this comparison. In this manner, the weight updater 622 may adjust the prediction weights 624 over time to improve the accuracy of future predictions of the prediction logic 620.

Apparatus and Method for Adaptively Scheduling Work on Heterogeneous Processing Resources When a new thread is to be executed, the embodiments described below identify the class associated with the thread (or the default class) and select the logical processor available within that class having the highest performance and/or best energy efficiency values. If the optimal logical processor is not available, one embodiment of the invention determines the next best logical processor and either schedules the new thread for execution on the next best performance or energy cores, or migrates a running thread from the optimal logical processor to make room for the new thread. In one embodiment, the decision to migrate or not migrate the running thread is based on a comparison of performance and/or energy values associated with the new thread and the running thread. In one implementation, it is up to the OS to choose the appropriate scheduling method per software thread, ether based on energy consumption (e.g., for low power environments) or best performance As used herein, a logical processor (LP) may comprise a processor core or a specified portion of a processor core (e.g., a hardware thread on the processor core). For example, a single threaded core may map directly to one logical processor whereas an SMT core may map to multiple logical processors. If the SMT core is capable of simultaneously executing N threads, for example, then N logical processors may be mapped to the SMT core (e.g., one for each simultaneous thread). In this example, N may be any value based on the capabilities of the SMT core (e.g., 2, 4, 8, etc). Other execution resources may be associated with a logical processor such as an allocated memory space and/or portion of a cache.

In some case, the platform may include a mix of cores, some of which include SMT support and some of which do not. In some cases, the performance and energy results of a core that has SMT support may be better than results on a non-SMT core when running more than one software thread. In other cases, the non-SMT core may provide better performance/energy results. Thus, in one embodiment, the scheduling order is: (1) schedule first on the core with highest performance/energy; (2) second, scheduled on the core with the lower perf/energy capabilities; and (3) finally, schedule on the core with SMT support.

It has been observed that random scheduling of threads from different types of workloads on a set of heterogeneous cores can result in lower performance than would be possible when compared with more intelligent allocation mechanisms.

In some embodiments described below, the "small cores" are Atom processors and the "big cores" are Core i3, i5, i7, or i9 cores. These cores may be integrated on the same die and/or interconnected on the same processor package. Note, however, that the underlying principles of the invention are not limited to any particular processor architecture or any specific type of processor or core.

At the same amount of power, a small core such as an Atom processor may provide higher performance than that of a big core. This power/performance cross point is a function of the ratio of big core IPC over small core IPC (i.e., $IPC_B/IPC_S$) which is particularly impacted for single threads or a small number of threads. The different $IPC_B/IPC_S$ values also impact the potential to reduce energy in order to improve battery life. As the ratio decreases, scheduling work on big cores becomes less attractive from an energy savings perspective.

In one embodiment, different classes are defined for different types of workloads. In particular, one embodiment defines a first class of workloads with an $IPC_B/IPC_S$ ratio below 1.3, a second class of workloads with an $IPC_B/IPC_S$ ratio below 1.5, and a third class of workloads with an $IPC_B/IPC_S$ ratio above (or equal to) 1.5.

Figure 8:
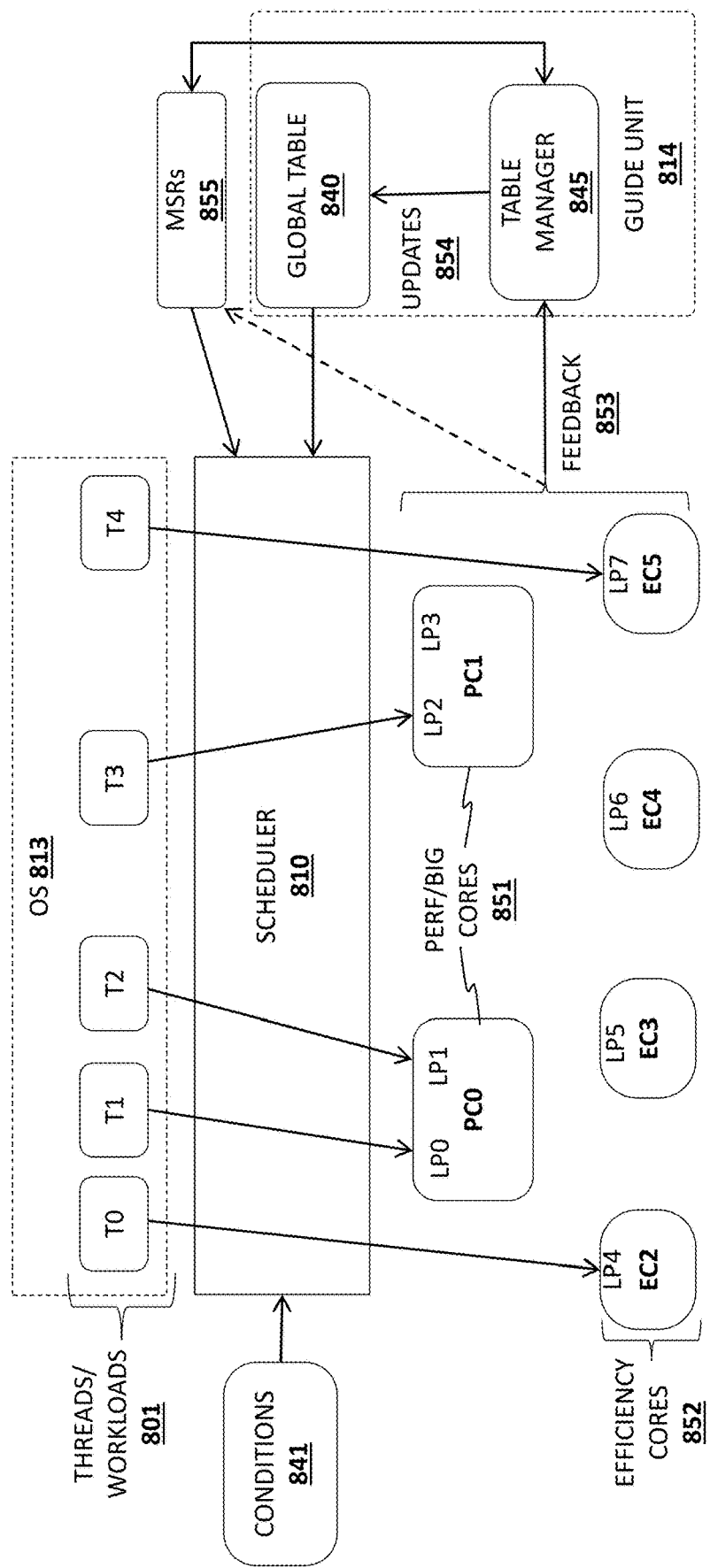
FIG. 8 illustrates an architecture in accordance with some embodiments in which a global table is used to schedule execution on cores and/or logical processors.

One embodiment of the invention maintains a global view of the performance and energy data associated with different workloads and core types as well as different classes of big/little IPC values. As shown in FIG. 8, in one implementation, this is accomplished with a global table 840 which stores the performance, energy, and other data for each type of core 851-852 and/or logical processor (LP). The global table 840 and other logic shown in FIG. 8 (e.g., table manager 845) may be implemented in hardware or by a combination of hardware and software.

For the purpose of illustration, two types of cores are shown in FIG. 8: performance cores 851 (sometimes referred to as "big" cores) and efficiency cores 852 (sometimes referred to as "little" cores). Note, however, that various additional cores and alternate combinations of big/little cores may be used. For example, some embodiments described below implement a disaggregated architecture in which an SoC/IO tile includes one or more cores (which may be selected during low utilization conditions so that the compute tiles can be moved into low power states).

In one embodiment, a scheduler 810 maps threads/workloads 801 to cores 851-852 and/or logical processors LP0-LP7 based on current operating conditions 841 and the performance and energy data from a global table 840 (described in greater detail below). In one embodiment, the scheduler 810 relies on (or includes) a guide/mapping unit 814 to evaluate different thread/logical processor mappings in view of the global table 840 to determine which thread should be mapped to which logical processor. The scheduler 810 may then implement the mapping. The scheduler 810, guide/mapping unit 814, table manager 845, and global table 840 may be implemented in hardware/circuitry programmed by software (e.g., by setting register values) or by a combination of hardware and software.

The currently detected operating conditions 841 may include variables related to power consumption and temperature, and may determine whether to choose efficiency values or performance values based on these conditions. For example, if the computing system is a mobile device, then the scheduler 810 may perform mapping using efficiency options more frequently, depending on whether the mobile device is currently powered by a battery or plugged into an electrical outlet. Similarly, if the battery level of the mobile computing system is low, then the scheduler 810 may tend to favor efficiency options (unless it would be more efficient to use a large core for a shorter period of time). As another example, if a significant amount of power of the overall power budget of the system is being consumed by another processor component (e.g., the graphics processing unit is performing graphics-intensive operations), then the scheduler 810 may perform an efficiency mapping to ensure that the power budget is not breached.

One embodiment of a global table 840, shown below as Table B, specifies different energy efficiency and performance values for each core 851-852 within each defined class (e.g., $Eff_{02}$, $Perf_{11}$, etc). The cores are associated with a logical processor number (LP0-LPn) and each logical processor may represent any type of physical core or any defined portion of a physical core, including an entire core.

In one embodiment, a table manager 845 performs updates to the global table 840 based on feedback 853 related to the execution of the different threads/workloads 801. The feedback may be stored in one or more MSRs 855 and read by the table manager 845.

The first time a thread/workload is executed, it may be assigned a default class (e.g., Class 0). The table manager 845 then analyzes the feedback results when executed in the default class, and if a more efficient categorization is available, the table manager 845 assigns this particular thread/workload to a different class. In one embodiment, the feedback 853 is used in one embodiment to generate an index into the global table 840. The classes in this embodiment are created based on ranges of $IPC_B/IPC_S$ as described above.

TABLE B

| Class 2 | | Class 1 | | Class 0 | | |
|---|---|---|---|---|---|---|
| Energy Eff. | Perf | Energy Eff. | Perf | Energy Eff. | Perf | Cores |
| $Eff_{02}$ | $Perf_{02}$ | $Eff_{01}$ | $Perf_{01}$ | $Eff_{00}$ | $Perf_{00}$ | LP0 |
| $Eff_{12}$ | $Perf_{12}$ | $Eff_{11}$ | $Perf_{11}$ | $Eff_{10}$ | $Perf_{10}$ | LP1 |
| | | | | | | ... |
| $Eff_{n2}$ | $Perf_{n2}$ | $Eff_{n1}$ | $Perf_{n1}$ | $Eff_{n0}$ | $Perf_{n0}$ | LPn |

In one embodiment, the scheduler 810 uses the global table 840 and associated information to realize a global view of the different core types and corresponding performance and energy metrics for different classes. Extensions to existing schedulers may add new columns per class type. In one embodiment, the different classes enable an operating system or software scheduler to choose different allocation mechanisms for a workload based on the class of that workload.

In one embodiment, Class 0 is defined as a default class which maintains legacy support and represents the median case of the curve. In this embodiment, the guide/mapping unit 814 and/or scheduler 810 uses this default class when no valid data has been collected for the current thread. As described above, the table manager 845 may evaluate feedback 853 related to the execution of the thread in the default class and provide an update 854 to the global table 840 if a different class is more appropriate. For example, it may categorize the thread into Class 1 if the $IPC_B/IPC_S$ ratio of the thread is greater than a first specified threshold (e.g., 1.5) and categorize the thread into Class 2 if the $IPC_B/IPC_S$ ratio is less than a second threshold (e.g., 1.3).

The different columns per class in the global table 840 may be specified via one or more control registers. For example, in an x86 implementation, the columns may be enumerated by CPUID[6].EDX[7:0] (e.g., for a table with 7-1 different columns per class). The operating system (OS) 813 and/or scheduler 810 can learn which line is relevant for each logical processor by one or more bits in EDX (e.g., CPUID.6.EDX[31-16]=n, where n is the index position which the logical processor's line is set) and can also determine the number of classes via a value in EDX (e.g., indicated by CPUID.6.EDX[11:8]). The OS can calculate the location of each logical processor line in the HGS table by the following technique:

---

If advanced hardware guided scheduling (e.g., HGS+) is enabled
 HGS Base Addr + 8 + FLOOR((# of classes * # of
 support capabilities bitmap set bits − 1) / 8+ 1) * 8 *( LPn
 row index +1)
 else ( advanced hardware guided scheduling is disabled and
basic hardware guided scheduling is enabled)
 HGS Base Addr + 8 + 8̲ * ( LPn row index +1)

---

The size of the HGS table can be enumerated by CPUID [6].EDX[11:8]

The OS can enumerate about the legacy HGS basic support from CPUID[6].EAX[19] and about the newer HGS+ support from CPUID[6].EAX[23]

In one embodiment, the performance capability values are non-semantic and do not necessarily reflect actual performance.

The performance columns in the table store relative performance values between the logical processors represented in the different rows. One embodiment of the interface provides for sharing of lines with a plurality of different logical processors that belong to the same core type, thereby providing for reasonable comparisons.

For each defined class, the ratio of performance values between cores within the same column such as $$Perf_{ijk} = \frac{Perf_{ik}}{Perf_{jk}}$$

provides a rough comparison but does not provide an actual performance value. Similarly, the ratio of energy efficiency values in a column such as $$Enery_{ijk} = \frac{Energy_{ik}}{Energy_{jk}}$$

for each logical processor provides a relative comparison, but does not reflect the actual energy consumed.

In one embodiment, the table manager 845 updates the global table 840 when the relative performance or energy value has experienced a significant change that can impact scheduling, such as when the order between the cores or the difference between the cores changes. These changes can be specified in one or more columns and, for each column that was updated, the column header is marked to indicate that the change was made. In addition, a status bit may be set in a control register to indicate that an update occurred. For example, in some x86 implementations, the status bit is set in a particular model-specific register (MSR).

The global table 840 can be updated dynamically as a result of physical limitations such as power or thermal limitations. As a result, part or all of the performance and energy class value columns may be updated and the order in which a core with the best performance or energy is selected may be changed.

When updates like this happen, the hardware marks the column(s) that was updated in the global table 840 (e.g., in the column header field). In addition, in one embodiment, the time stamp field is updated to mark the last update of the table.

In addition, the thermal status registers may also be updated and, if permitted by the OS, the thermal interrupts. An interrupt may also be generated to notify the OS about the changes. Following the setting of the thermal updates, the table manager 845 may not update the global table 840 any more until permitted by the OS (e.g., the OS clears the log bit). This is done in order to avoid making changes while the OS is reading the table.

Given that that different classes may be impacted in a different way for different physical limitations, one embodiment of the invention provides the ability to update only selected table classes. This configurability provides for optimal results even when the physical conditions are changed. Following an indication that the order of the class performance or energy is changed, the OS may reschedule software threads in accordance with each software thread's class index.

In one embodiment, in response to detected changes, a thread-level MSR 855 reports the index into the current thread column to the OS 813 and/or scheduler 810 as well as a valid bit to indicate whether the reported data is valid. For example, for a thread-level MSR 855, the following bits may provide indications for RTC (run time characteristics):

Bit 7:0—Application class index of the table, representing the latest "Application Class" executed on this hardware thread;

Bit 63—Valid bit; if set to 1, the OS/scheduler can use it, otherwise the class index should be ignored In one embodiment, the valid bit is set or cleared based on the current state and operational characteristics of the microarchitecture. For example, the data may not be valid following a context switch of a new thread 801 until the hardware (e.g., the table manager 845) can evaluate or otherwise determine the characteristics of the new thread. The valid bit may also be adjusted when transitioning between specific security code flows. In circumstances where the valid bit is not set, the scheduler 810 may ignore the feedback data and use the last index known to be valid.

In one embodiment, the OS 813 and/or scheduler 810 reads this MSR 855 when swapping out a context in order to have the most up-to-date information for the next context swapped in. The OS 813 and/or scheduler 810 can also read the MSR 855 dynamically during runtime of the current software thread. For example, the OS/scheduler may read the MSR 855 on each tick of the scheduler 810.

In order for the hardware (e.g., the table manager 845) to have the time required to learn about the new thread and ensure the validity of the report index after the new context is swapped in, one embodiment of the invention provides the option to save and restore the microarchitectural metadata that includes the history of the index detection. In one implementation, this is accomplished using the MSR 855 which can be ether read or written as a regular MSR or by utilizing the processor's save and restore mechanisms (e.g., such as XSAVES/XRESROS on an x86 implementation). For example:

Thread level Scope MSR (Read/Write)
Bit 63:0—software thread, hardware feedback history metadata.

In one implementation, the OS 813 and/or scheduler 810 reads this metadata when swapping in the thread and updates it during execution and/or when swapping out the same thread.

In some implementations where metadata is not supported, prediction history is still need to be reset during a context switch in order to enable valid feedback that will not be impacted from previous execution of the software thread. This reset data may be enabled if the OS is configured to "opt-in" support of history reset every time that IA32_KENTEL_GS_BASE is executed. Other OS-based context switch techniques that include H/W architecture methods may also be used in order to reset the hardware guided scheduling prediction history during context switches. In another embodiment, a specific MSR is enabled with a control bit that forces resetting the history. This control MSR can be ether saved and restored by XSAVES/XRESORS or manually used by the OS on every context switch. other option can be that every time that the value of this MSR be zero, write or restore this MSR will reset the hardware guided scheduling history, Another embodiment resets the history via a thread level config MSR (as described below) that enables the option for the OS to manually reset the history.

The OS 813 and/or scheduler 810 can enable and disable the extension of the global table 840 via an MSR control bit. This may be done, for example, to avoid conflicts with legacy implementations and/or to avoid power leakage. For example, the operating system may dynamically disable the features described herein when running on legacy systems. While disabled, the feedback MSR thread level report is invalid. Enabling can be done at the logical processor level in order to provide, for example, the VMM the option to enable the techniques described herein for part of an SoC based on each VM usage mode (including whether the VM supports these techniques).

In one particular embodiment, the thread level configuration is implemented as follows:

---

IA32_HW_FEEDBACK_THREAD_CONFIG provides Read/Write thread level scope (0x17D3)
- Bit 0: Enables logical processor support for the scheduling techniques described herein. When set to 1, enables the support of the thread level hardware feedback and resets its history. Default: 0.
- Bit 1: WRMSR_IA32_KERNEL_GS_BASE_CLEAR_HGS_HISTORY, when set, WRMSR of IA32_KERNEL_GS_BASE resets the prediction history. Default: 0
- Bit 2: Reset the history command bit, always reads as 0, reset the prediction history when set (written with '1')

---

In one implementation, the enabling and disabling is performed via a package-level MSR. For example, in an x86 implementation the following MSR may be specified:

---

IA32_HW_FEEDBACK_CONFIG
Bit 0 - Enable. When set 1, this bit enables the hardware feedback interface described herein. The default is 0.
Bit 1 - Enable. When set to 1, this bit enables multiple class support. The extra classes columns in the global table 840 are valid only while bit 1 is set. Setting this bit enables the thread level feedback 853 sent to the MSR 855 to support valid report class indices.

---

As mentioned, when a new thread is to be executed, embodiments of the invention identify the class associated with the thread (or the default class) and select the logical processor (LP) available within that class having the highest performance and/or best energy efficiency values (depending on the current desired power consumption). If the optimal logical processor is not available, one embodiment of the invention determines the next best logical processor and either schedules the new thread for execution on the next best logical processor, or migrates a running thread from the optimal logical processor to make room for the new thread. In one embodiment, the decision to migrate or not migrate the running thread is based on a comparison of performance and/or energy values associated with the new thread and the running thread.

For a "High Priority" thread, the relevant column is determined based on the thread class index (k). In one embodiment, the index is provided by a feedback MSR 855. On the thread performance class column (k), a row is identified with the highest performance value. If the corresponding logical processor is free, then the thread is scheduled on this logical processor.

Alternatively, if all highest performance logical processors are occupied, the performance class column (k) is then searched for a free logical processor, working from highest to lowest performance values. When one is located, the thread may be scheduled on the free logical processor or a running thread may be migrated from the preferred logical processor and the new thread may be scheduled on the preferred logical processor.

In this embodiment, the scheduler 810 may evaluate whether to migrate an existing thread to a different logical processor to ensure a fair distribution of processing resources. In one embodiment, comparisons are made between the different performance values of the different threads and logical processors to render this decision, as described below.

Thus, in one embodiment, when a new thread must be scheduled for execution on a logical processor, the index of the new thread (I) is used to search for a free logical processor in the performance class associated with the new thread (e.g., one of the columns in the global table 840). If there is an idle logical processor with the highest performance value then the new thread is scheduled on the idle logical processor. If not, then a secondary logical processor is identified. For example, the scheduler may search down the column in the global table 840 to identify the logical processor having the second highest performance value.

An evaluation may be performed to determine whether to migrate any running threads from a logical processor which would be a highest performance LP for the new thread to a different logical processor to make room for the new thread on the highest performance logical processor. In one embodiment, this evaluation involves a comparison of the performance values of the running thread and the new thread on the highest performance logical processor and one or more alternate logical processors. For the new thread, the alternate logical processor comprises the secondary processor (i.e., which will provide the next highest performance for the new thread). For the running thread, the alternate logical processor may comprise the secondary logical processor (if it will provide the second highest performance) or another logical processor (if it will provide the second highest performance).

In one particular implementation, the ratio of the performance on highest performance LP over performance on the alternate LP for both the new thread and the running thread. If the ratio for the new thread is greater, then the running thread is migrated to its alternate logical processor. if the ratio for the running thread is greater, then the new thread will be scheduled on its alternate logical processor. The following are example ratio calculations:

New Thread Comp Value=$\text{Perf}_{new\ thread\ highest}/\text{Perf}_{new\ thread\ alternate}$ Running Thread Comp Value=$\text{Perf}_{running\ thread\ highest}/\text{Perf}_{running\ thread\ alternate}$ If the above ratio is greater for the new thread, then the running thread is migrated to its alternate logical processor (i.e., the LP on which it will have the second highest performance) and new thread is scheduled to execute on its highest performance logical processor. If the ratio is greater for the running thread, then the new thread is scheduled on the secondary LP (which will provide it with the second highest performance).

In one embodiment, when energy efficiency is selected as the determining factor, the same techniques as described above are implemented to determine the logical processor for the new thread but using the efficiency class data from the global table 840 instead of the performance class data.

For example, the index of the new thread (I) is used to search for a free logical processor in the efficiency class associated with the new thread. If there is an idle logical processor with the highest efficiency value, then the new thread is scheduled on the idle logical processor. If not, then a secondary logical processor is identified. For example, the scheduler may search down the column in the global table 840 to identify the logical processor having the second best efficiency value. An evaluation is performed to determine whether to migrate any running threads from a logical processor which would be a highest efficiency LP for the new thread to a different logical processor to make room for the new thread. To render this decision, efficiency ratios may be determined as described above for performance:

New Thread Comp Value=$\text{Eff}_{new\ thread\ highest}/\text{Eff}_{new\ thread\ alternate}$ Running Thread Comp Value=$\text{Eff}_{running\ thread\ highest}/\text{Eff}_{running\ thread\ alternate}$ As with performance, the thread with the larger index is executed on the highest efficiency logical processor, while the other thread is run (or migrated) to an alternate logical processor.

The above analysis may be performed to allocate and migrate threads in the same or different performance and efficiency classes. If the new thread has a different class index as the other threads in busy logical processors, then the performance or efficiency ratio is determined using the highest performance or efficiency value over the next best performance or efficiency value for each of the threads currently running and/or new threads to be scheduled. Those threads with the highest ratios are then allocated to the highest performance or efficiency logical processors while the others are scheduled (or migrated) on the next best performance or efficiency logical processors.

In one embodiment, in order to migrate a running thread, the ratio of the new thread must be greater than the running thread by a specified threshold amount. In one embodiment, this threshold value is selected based on the amount of overhead required to migrate the running thread to the new logical processor (e.g., the processing resources, energy, and time consumed by the migration). This ensures that if the ratio of the new thread is only slightly higher than that of the running thread, then the running thread will not be migrated.

In one embodiment, the scheduler 810 performs a thread allocation analysis periodically (e.g., every 15 ms, 20 ms, etc) to perform the above performance and/or efficiency comparisons. If a higher performance or improved energy efficiency option is available, it will then migrate one or more threads between logical processors to achieve this higher performance or higher efficiency option.

Some existing scheduling implementations provide a global view of the performance and energy characteristics of different core/processor types. However, these implementations assume the same level of big/little $\text{IPC}_S$ and take the median value of all possible traces while ignoring the actual differences between different types of software threads. The embodiments of the invention address this limitation by considering these differences.

Apparatus and Method for Dynamic Core Management

Various embodiments of the invention evaluate different types of core parking and core consolidation hints, requests, and other relevant conditions to generate a resolved hardware-guided scheduling (HGS) hint, while architecturally meeting the requirements of dynamic core parking scenarios that may mall coexist in the processor. Some embodiments coordinate with the OS scheduler to determine a specific set of cores to be parked or consolidated in view of runtime metrics such as core utilization, thread performance, memory dependencies, core topology, and voltage-frequency curves. At least one embodiment allocates a power budget to different IP blocks in the processor to deliver a desired performance, recognizing the differences in the relative priority of each type of compute block as well as the differences in the power/frequency and frequency/performance relationships in each of the compute blocks. Some implementations allocate the power budget in view of a disaggregated, heterogeneous processor architecture with separate compute tiles, SoC tiles, graphics tiles, and IO tiles.

As used herein, a "parking" hint refers to a request or recommendation to avoid using specific cores (e.g., thereby "parking" the cores). The parking hints and other types of hints described herein may be communicated via a hardware feedback interface (HFI) storage such as a register (e.g., an MSR) or memory region allocated by the operating system (OS).

Currently, parking hints have the disadvantage of hiding the performance capabilities of the parked cores from the OS. As a result, when the OS has high priority work that no longer fits within the available cores, and it wants to run that work on a high performance core, it has no information as to what core to use.

A "consolidation" hint is a request generated to consolidate efficient work to a subset of the cores on the processor. In existing implementations, the OS may erroneously interpret this hint as a request to consolidate all work on this subset of cores, even if lower priority work must be deferred. A particular type of consolidation, referred to as "below PE consolidation" (BPC) attempts to contain the number of cores to bring the per-core frequency above a limit when the system is frequency limited.

Processor "survivability" features are activated when there are thermal and/or electrical reasons to reduce the number of cores to avoid shut down of the processor. In some implementations, survivability causes cores to be parked rather than contained to ensure that the OS will not start using more cores than hinted. In some embodiments, parking starts with the most power-consuming cores. For example, in the disaggregated architectures described below, the parking order may be: highest performance big cores (e.g., ULT big cores), big cores, compute die small cores (e.g., compute die Atom cores), and SoC die small core (e.g., SoC die Atom cores). In the final stages, the SoC may run out of a single SoC die core. In one embodiment, when only a single efficient core is active, the survivability feature is deactivated. Because this feature is critical, it overrides other hints/configuration settings; at the same time this condition is not expected to occur very often.

In some embodiments, because the goal of both below BPC and survivability is to reduce the number of cores, when BPC and survivability both are active, BPC is bypassed to avoid aggressive constraining when not required.

Various hardware-based techniques may be used for optimizing active cores. For example, with Hardware Guided Scheduling (HGS) (e.g., as implemented on hardware guide unit 814 described above), hints may be provided to the OS to not schedule work on a subset of cores (core parking) and/or hints to only schedule the work on a subset of cores (core consolidation), with the goal of improving overall power and performance (PnP). Some embodiments of the invention determine a specific set of cores to be parked or consolidated in view of the disaggregated architecture of the processor, various runtime metrics (e.g., core utilization, temperature), thread performance, memory dependencies, core topology, and voltage-frequency curves.

Examples of Heterogeneous Processors and Power Management Architectures

Figure 9:
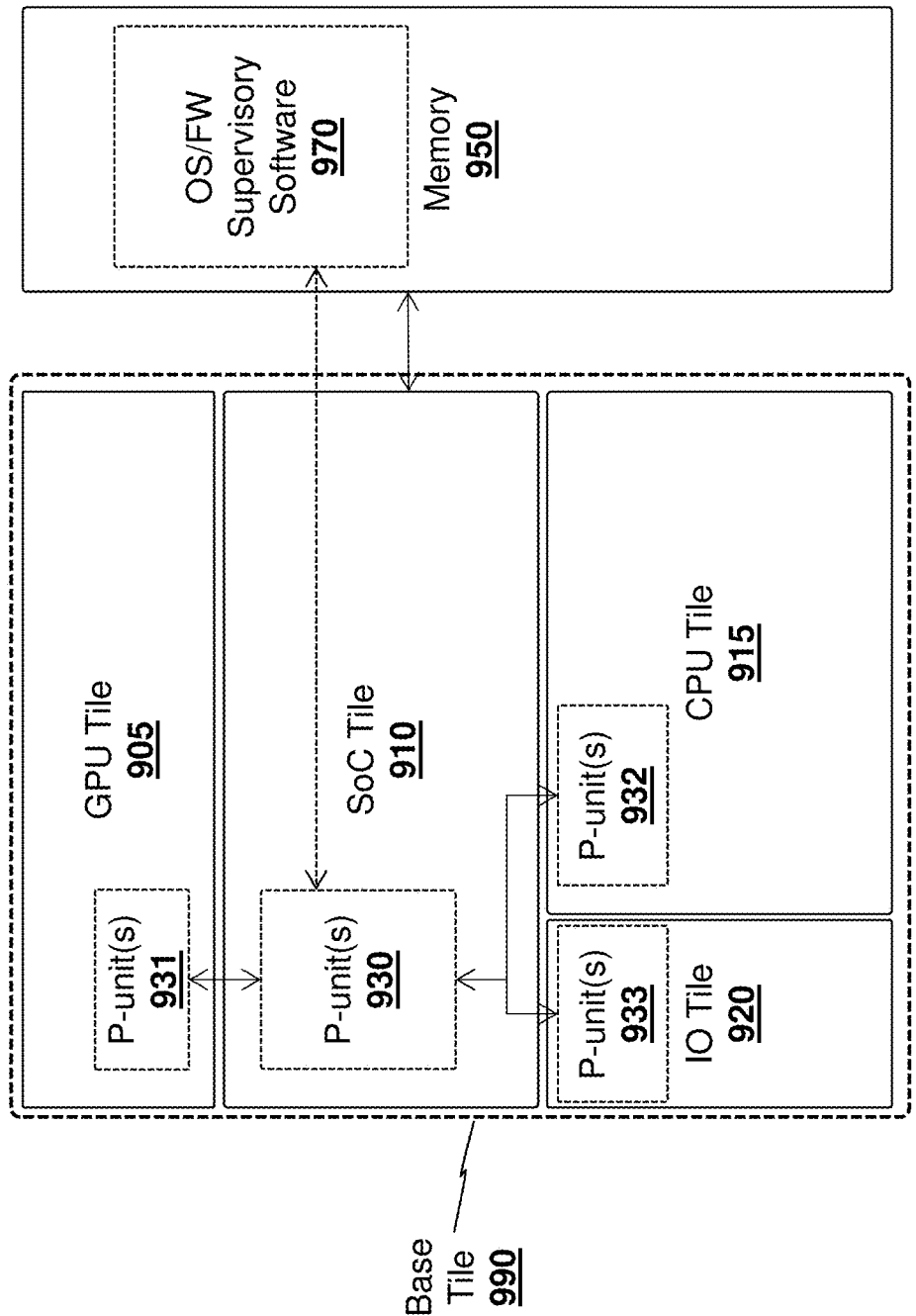
FIG. 9 illustrates a disaggregated tile-based architecture on which embodiments of the invention may be implemented.

FIG. 9 illustrates an example of a processor with a disaggregated architecture comprising an SoC tile 910, a CPU tile 915, A GPU tile 905, and an IO tile 920 which are integrated on a common base tile 990 coupled to a package substrate. In some embodiments, each tile comprises a separate die or chip which communicates with other dies/chips over horizontal and/or vertical interconnects (e.g., through-silicon vias). The SoC tile 910 includes a memory controller to couple the processor to system memory 950 and provides various other SoC-level functions such as coherent fabric interconnects between the various IP blocks, a display engine, and a low-power IP block which remains operational, even when the processor enters into low power states.

Some embodiments implement a distributed power management architecture comprising a plurality of power management units (P-units) 930-933 distributed across the various dies 905, 910, 915, 920, respectively. In certain implementations, the P-units 930-933 are configured as a hierarchical power management subsystem in which a single P-unit (e.g., the P-unit 930 on the SoC tile 910 in several examples described herein) operates as a supervisor P-unit which collects and evaluates power management metrics provided from the other P-units 931-933 to make package-level power management decisions and determine power/performance states at which each of the tiles and/or individual IP blocks are to operate (e.g., the frequencies and voltages for each of the IP blocks).

The supervisor P-unit 930 communicates the power/performance states to the other P-units 931-933, which implement the power/performance states locally, on each respective tile. In some implementation, the package-wide power management decisions of the supervisor P-unit 930 include decisions described herein involving core parking and/or core consolidation.

An operating system (OS) and/or other supervisory firmware (FW) or software (SW) 970 may communicate with the supervisory P-unit 930 to exchange power management state information and power management requests (e.g., such as the "hints" described herein). The hardware guide unit 814 and associated tables may be implemented in the supervisor P-unit 1030 and/or the SoC tile 910. In some implementations described herein, the communication between the OS/supervisory FW/SW 970 and the P-unit 930 occurs via a mailbox register or set of mailbox registers. In some embodiments, a Baseboard Management Controller (BMC) or other system controller may exchange power control messages with the supervisory P-unit 930 via these mailbox registers or a different set of mailbox registers.

Figure 10:
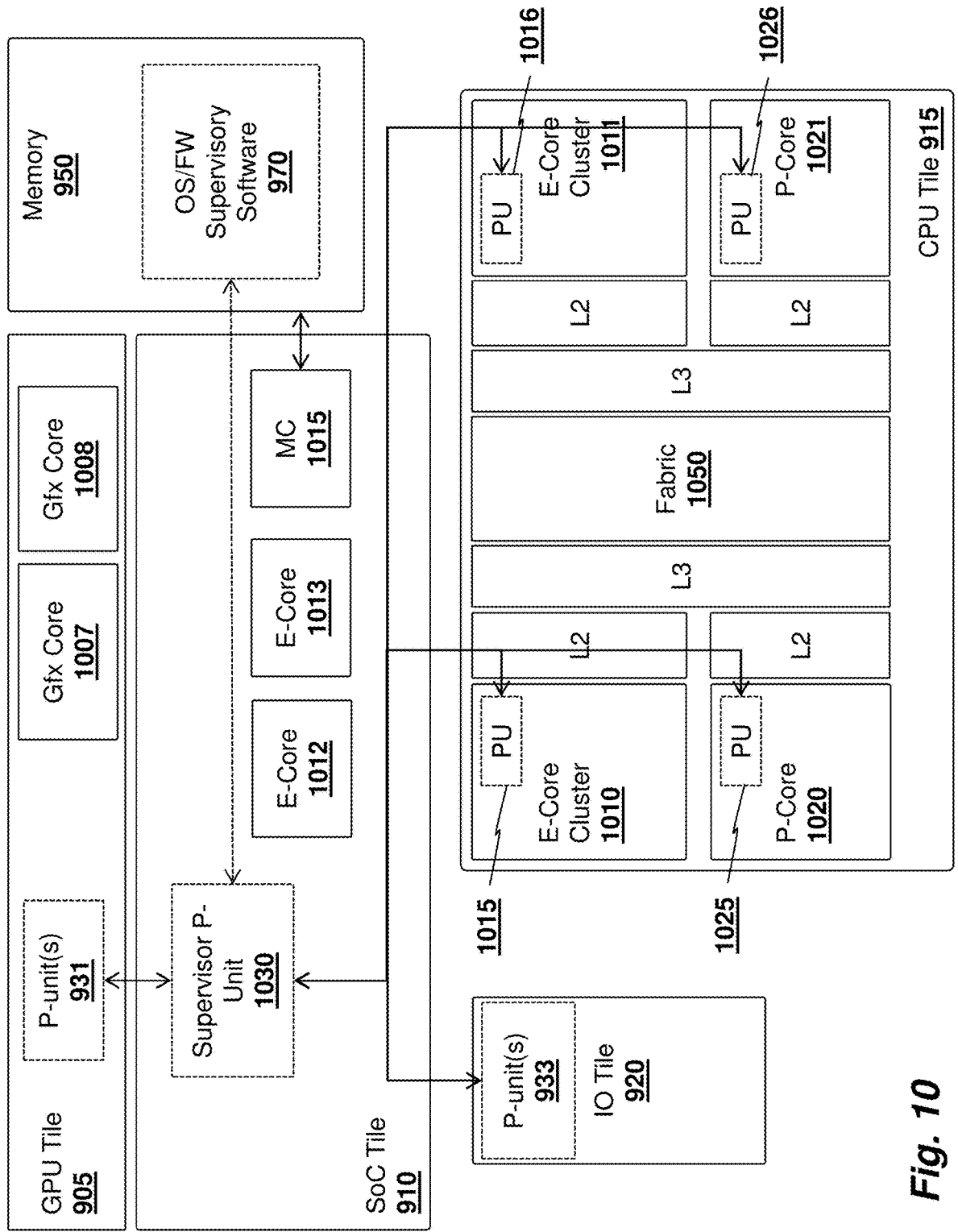
FIG. 10 illustrates additional details of one embodiment of the disaggregated tile-based architecture.

FIG. 10 illustrates additional details of one embodiment of a CPU tile 915, which includes a heterogeneous set of cores including efficiency cores (E-cores) arranged into two E-core clusters 1010-1011 and a plurality of performance cores (P-cores) 1020-1021. Some embodiments of the SoC tile 910 include a set of E-cores 1012-1013 and a memory controller 1015 to couple the processor to system memory 950 (e.g., DDR DRAM memory, HBM memory, etc). Similarly, the GPU tile 905 includes a plurality of graphics cores 1007-1008 which may be managed in the same manner as the P-cores and E-cores as described herein.

The E-cores in the E-core clusters 1010-1011 and the SoC tile 910 are physically smaller (with multiple E-cores fitting into the physical die space of a P-core), are designed to maximize CPU efficiency, measured as performance-per-watt, and are typically used for scalable, multi-threaded performance. The E-cores work in concert with P-cores 1020-1021 to accelerate tasks which tend to consume a large number of cores. The E-cores are optimized to run background tasks efficiently and, as such, smaller tasks are typically offloaded to E-cores (e.g., handling Discord or antivirus software)—leaving the P-cores 1020-1021 free to drive high performance tasks such as gaming or 3D rendering.

The P-cores 1020-1021 are physically larger, high-performance cores which are tuned for high turbo frequencies and high IPC (instructions per cycle) and are particularly suited to processing heavy single-threaded work. In some embodiments, the P-cores are also capable of hyper-threading (i.e., concurrently running multiple software threads).

In the illustrated embodiment, separate P-units 1015-1016 are associated with each E-core cluster 1010-1011, respectively, to manage power consumption within each respective E-core cluster in response to messages from the supervisor P-unit 1030 and to communicate power usage metrics to the supervisor P-unit 1030. Similarly, separate P-units 1025-1026 are associated with each P-core 1020-1021, respectively, to manage power/performance of the respective P-core in response to the supervisor P-unit 1030 and to collect and communicate power usage metrics to the supervisor P-unit 1030.

In one embodiment, the local P-units 1015-1016, 1025-1026 manage power locally by independently adjusting frequency/voltage levels to each E-core cluster 1010-1011 and P-core 1020-1021, respectively. For example, P-units 1015-1016 control digital linear voltage regulators (DLVRs) and/or fully integrated voltage regulators (FIVRs) to independently manage the frequency/voltage applied to each E-core within the E-core clusters 1010-1011. Similarly, P-units 1025-1026 control another set of DLVRs and/or FIVRs to independently manage the frequency/voltage applied to each P-core 1020-1021. The graphics cores 1007-1008 and/or E-cores 1012-1013 may be similarly controlled via DLVRs/FIVRs. In these implementations, the frequency/voltage associated with a first core may be dynamically adjusted independently—i.e., without affecting the frequencies/voltages of one or more other cores. The dynamic and independent control of individual E-cores/P-cores provides for processor-wide Dynamic Voltage and Frequency Scaling (DVFS) controlled by the supervisor P-unit 1030.

Figure 11:
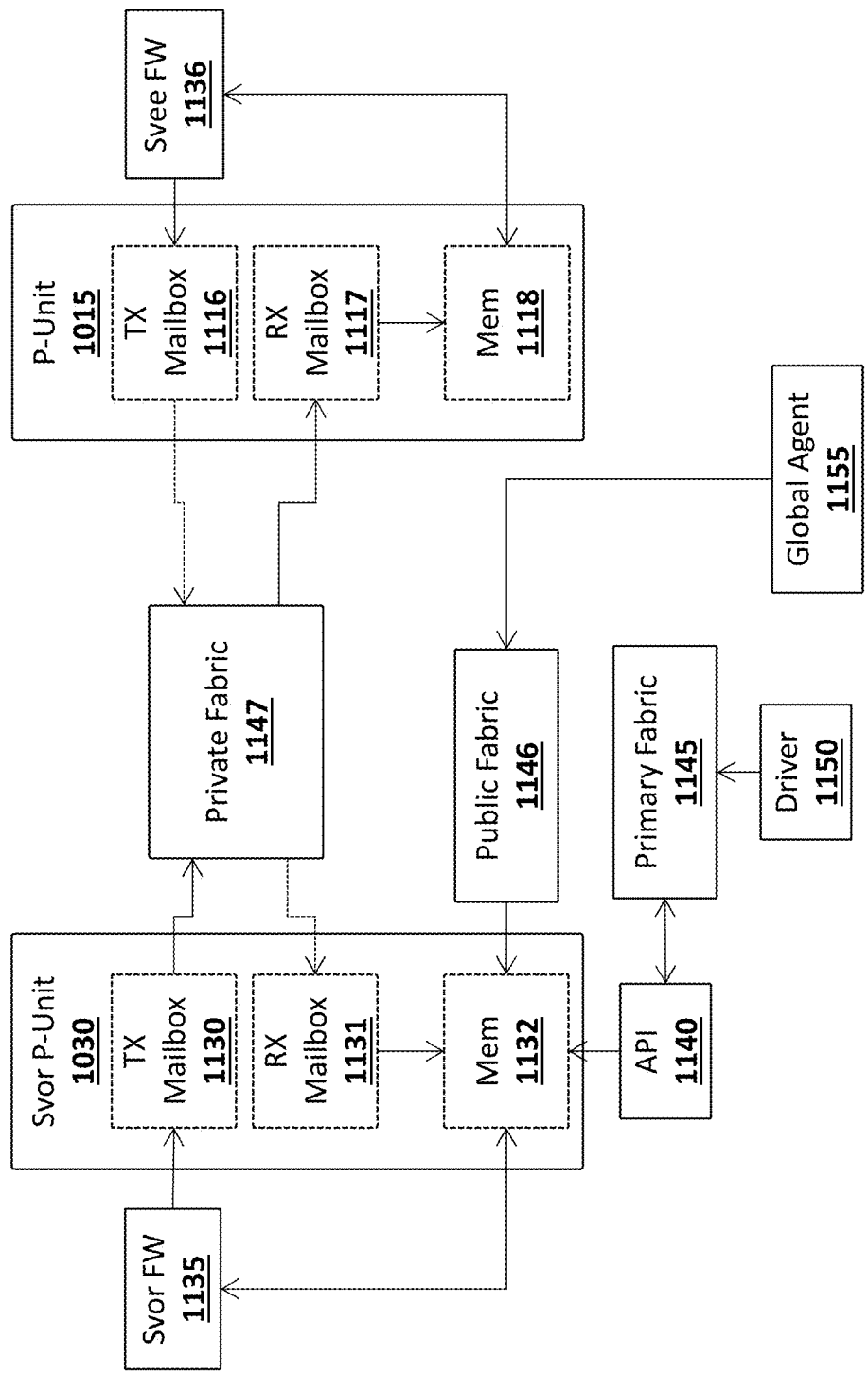
FIG. 11 illustrates communication between power units in accordance with some embodiments.

As illustrated in FIG. 11, in some implementations, the supervisor P-unit 1030 and other P-units 1015 in the processor communicate via a private fabric 1147. The supervisor P-unit 1030 sends power management messages to other P-units 1015 via a transmit (TX) mailbox 1130 and receives messages from the other P-units via a receive (RX) mailbox 1131. Each of the other P-units (such as P-unit 1015, shown for simplicity) includes a TX mailbox 1116 for transmitting messages and an RX mailbox 1117 for receiving messages.

In some embodiments, the P-units 1030, 1015 include microcontrollers or processors for executing firmware 1135, 1136, respectively, to perform the power management operations described herein. For example, supervisor firmware (FW) 1135 executed by supervisor p-unit 1030 specifies operations such as transmission of messages sent to TX mailbox 1030, and over the private fabric 1147 to the RX mailbox 1117 of p-unit 1015. Here, the "mailbox" may refer to a specified register or memory location, or a driver executed in kernel space. Upon receiving the message, RX mailbox 1017 may save the relevant portions of the message to a memory 1118 (e.g., a local memory or a region in system memory), the contents of which are accessible by P-unit 1015 executing its copy of the FW 1136 (which may be the same as or different from the FW 1135 executed by the supervisor P-unit 1030).

In response to receiving the message, the P-unit 1015 executing the firmware 1136 confirms reception of the message by sending an Ack message to supervisor 1030 via TX mailbox 1116. The Ack message is communicated to RX mailbox 1131 via fabric 1147 and may be stored in memory 1132 (e.g., a local memory or a region in system memory). The supervisor P-unit 1030 (executing FW 1135) accesses memory 1132 to read and evaluate pending messages to determine the next course of action.

In various embodiments, supervisor p-unit 1030 is accessible by other system components such as a global agent 1155 (e.g., a platform supervisor agent such as a BMC) via public fabric 1146. In some embodiments, public fabric 1146 and private fabric 1147 are the same fabric. In some embodiments, the supervisor p-unit 1030 is also accessible by software drivers 1150 (e.g., operable within the OS or other supervisory FW/SW 970) via a primary fabric 1145 and/or application programming interface (API) 1140. In some embodiments, a single fabric is used instead of the three separate fabrics 1145-1147 shown in FIG. 11.

Resolving Core Management Requests

In the architectures described herein, hints may be generated by a variety of system entities. For example, overclocking and other system software entities may attempt to force parking of certain cores. In addition, workload type (WLT) hints (e.g., indicating specific workload types such as bursty, sustain, battery life, idle) can result in consolidation of performance cores or energy-efficient cores. In disaggregated architectures, for certain energy-efficient workloads, it may be preferable to shut down the compute dies 1020-1021, 1010-1011, and run out of one or more of the E-cores 1012-1013 of the SoC die 910 ("SoC die biasing"), which may be accomplished with a parking/consolidation hint to the OS 970. However, there are other instances where SoC die biasing is not the correct choice for improved power/performance (PnP).

In current implementations, as the system becomes constrained, all cores may be forced to run below the current power state (Pe) limit. In these scenarios it may be preferable to reduce the number of cores and run at a frequency which is more efficient and gradually unpark the cores as the system becomes able to run all cores at an efficient frequency. Some embodiments of the invention use below Pe consolidation (BPC) to contain the number of cores and bring the per-core frequency above a specified limit (e.g., when the system is frequency-limited). When the system is close to a survivability point, even after processor actions are taken to reduce power, the cores may be gradually brought down one after the other via core parking hints. The power is monitored periodically until the system returns to a stable power limit. There may also be gaming or other platform/OEM driver-aware implementations that require the platform to be less noisy, cooler, or higher performing. In these cases the platform software can request to moderate the core parking actions that are taken via WLT to achieve the desired end state from a platform standpoint.

All of the above features rely on target core parking and consolidation. Given the large number of potential variables and hints/requests, it would be beneficial to resolve these hints into a single unified hint to be provided to the schedule, while architecturally meeting the requirements of different dynamic parking scenarios that all coexist in the processor at any point in time. It would also be beneficial to determine the individual cores to be parked based on the scenario at hand and in accordance with the architectural intent and in view of an optimal PnP.

The table 1200 in FIG. 12 lists the variables used to determine the specific cores to be parked/consolidated in accordance with some embodiments of the invention. Table 1200 includes columns indicating the name of the associated feature 1202, the WLT sub-condition (if applicable) 1203, whether SoC die biasing is applicable and used 1204, operation when the feature condition is met 1205 and when not met 1206, and the type of action performed on the cores 1207.

In this example, as indicated in the "Stage 0" row, a priority mailbox is provided for overclocking and other software (e.g., gaming apps, . . . etc) to submit parking requests which are assigned a high priority, thereby creating a boundary condition for further optimization. For example, the priority mailbox may be used to "park" or allocate a specific core or set of cores to a specific thread or group of threads (as indicated in column 1207). In some implementations, the specific cores requested via this mailbox are always be honored. Additional checks are added to avoid Security DoS, as indicated in column 1206.

The "Stage 1" row indicates workload type (WLT) and SoC die biasing requests in column 1202. In these embodiments, the biasing to use the SoC die is qualified with the specified WLT. If the WLT indicates "Bursty" or "Sustain" then work is not moved to the E-cores on the SoC die, as indicated in column 1204, whereas workload types associated with low workload requirements (e.g., BL/IDLE subconditions) are aligned towards moving work to the SoC die (which is capable of running independently at the lowest power states). However, in circumstances where the E-cores of the SoC Die would not be the most efficient cores (e.g., based on a dynamic analysis such as the current supply voltage of the SoC die), then idle/battery life (BL) work is consolidated to an equivalent set of E-cores cores on a compute die.

In general, the WLT indication may be used to determine whether to perform core parking or consolidation. For sustain/bursty workloads, core parking may be used (Perf=EE=0) as this allows the OS to restrict scheduling to P-cores. For battery life/idle WLTs, core consolidation may be used (EE=255) allowing the OS to expand to other cores as the utilization increases (e.g., as measured in workload queues).

In some embodiments, exceptions to the above are specified in view of survivability scenarios (described below).

Some implementations attempt to skip below the PE consolidation stage (reducing threads to improve the frequency floor) when a survivability trigger is reached (e.g., the electrical or thermal metrics reach a threshold). This will avoid duplication as both survivability and PE consolidation attempt to reduce the number of active cores to reduce power. PE consolidation does so to improve performance. While the high level operations are the same, at a lower level the core selection techniques are different (as described further below).

In the case of survivability, a parking hint may be generated regardless of whether WLT and/or other stages prior recommended core consolidation. This is required because for survivability, the OS should have the ability to restrict to a limited number of active cores. In some embodiments, survivability is incremental-gradually reducing the number of active cores. In one embodiment, the performance/EE projection is sorted and used to choose individual cores to park or consolidate. An example of the performance and EE projection data is shown in the logical processor capabilities table 1340 described below with respect to FIG. 13.

In one embodiment, the following approach is taken. First, for survivability, the intent is to save power. As such, the cores are sorted starting with the highest performance and the top of the sorted list is used for parking.

With respect to workload type (WLT), for battery life/idle workload types, or no inference, the intent is to use the E-cores. As such, the cores are sorted starting with the highest efficiency values. The cores to contain/consolidate are then selected from the top of the sorted list.

With respect to a WLT of bursty/sustain, the intent is to use the highest performing cores. Consequently, the cores are sorted starting by performance with the highest performance at the top of the sorted list. Cores are then selected for parking from the bottom of the sorted list.

Figure 13:
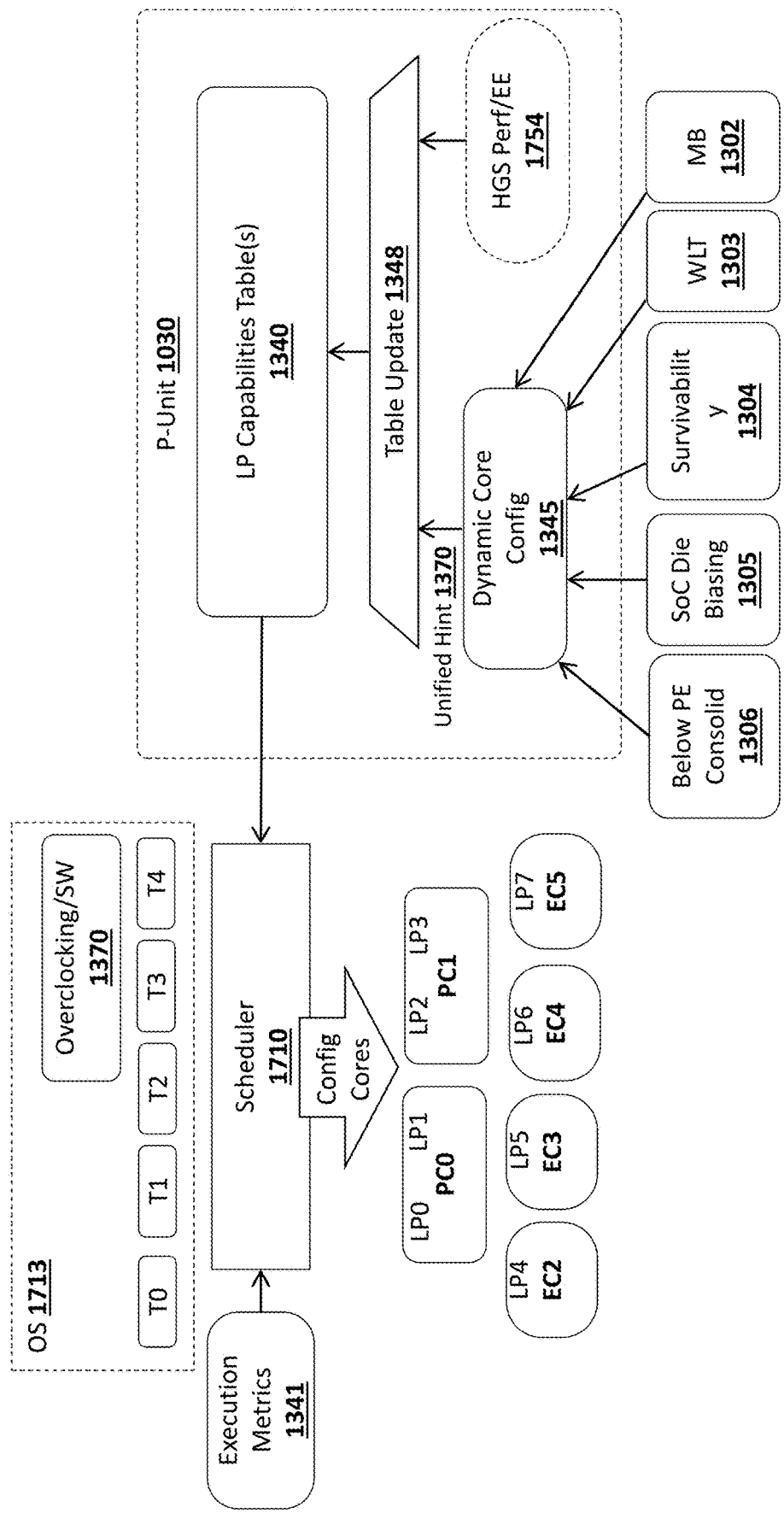
FIG. 13 illustrates an architecture for generating a unified hint based on a plurality of generated hints in accordance with some embodiments.

FIG. 13 illustrates one embodiment of a power management unit 2030 including dynamic core configuration logic 1345 for implementing the techniques described herein to resolve a plurality of parking/or and consolidation requests/hints 1302-1306. As mentioned, overclocking or other software 1370 may submit core parking hints to a mailbox 1302 to park or allocate a specific core or set of cores to a specific thread or set of threads (e.g., reserving specific core(s) for specific thread(s)). Other illustrated hints/requests include those related to below PE consolidation 1306, SoC die biasing 1305, survivability 1304, and workload type (WLT) parking 1303, various examples of which are provided herein.

In one embodiment, the dynamic core configuration logic 1345 resolves this combination of hints 1302-1306 into a unified core parking and/or core consolidation hint 1370. In addition, the hardware guide unit 814 (sometimes referred to as the hardware guide scheduler, HGS, or HGS+) continues to generate EE/Perf updates 854 as previously described with respect to FIG. 8. In one implementation, the HGS/HGS+ functionality is encoded in the firmware 1135 executed by the SoC tile P-unit 2030.

In one embodiment, update logic 1348 updates the logical processor capabilities table 1340 based on the unified hint 1370 or the Perf/EE updates 854. In operation, the Perf/EE HGS hints 854 may be generated and populated locally. The dynamic core configuration logic 1345 consolidates and resolves the various features 1302-1306 attempting to independently override the HGS Hints 854. Once the resolution is complete, the unified parking/consolidation hint 1370 overrides the HGS updates 854 and the table update logic 1348 updates the logical processor capabilities table(s) 1340 (sometimes referred to as the hardware feedback interface or HFI table) in accordance with the unified hint 1370.

TABLE C

EXAMPLE PROCESSOR:
1 Big Core, 8 Compute Die

| E-cores, 2 SoC Die E-Cores WLT | SoC Die Biased | Slider Not Enabled Config | | |
|---|---|---|---|---|
| | | Big Core | Compute E-Core | SoC E-Core |
| Bursty (PARK) | NA | 4 | 0 | 0 |
| Sustain (PARK) | NA | 4 | 8 | 2 |
| Idle (CONTAIN) | Y | 0 | 0 | 2 |
| Battery Life (CONTAIN) | Y | 0 | 0 | 2 |
| Battery Life/Idle (CONTAIN) SoC Die E-Core Disable | N | 0 | 2 | 0 |

Table C provides an example of a default core parking/containment for a particular processor having 1 Big Core, 8

Compute Die E-cores, and 2 SoC Die E-cores. In this implementation, for bursty WLTs, only Big cores are enabled. in the case of battery life (BL), either 2 SoC die E-Cores or two compute die E-cores are active based on SoC die biasing. For a sustain WLT, all cores are active and for an idle WLT, two SoC die E-cores are active.

Some embodiments described herein have a disaggregated processor architecture with DLVR support as well as both compute die E-cores and SoC die E-cores, which are more efficient at certain frequencies and system states. As such, SoC die biasing is used in some embodiments in which hints consolidate operations into the SoC die E-Cores, allowing the compute die cores to be powered down and conserving power.

FIG. 14 illustrates an example set of EE/Perf data in a logical processor capabilities tables 1340 and different sets of class coding data 1401 indicating different combinations of Perf/EE values for different classes associated with LPs. In one implementation, the guide unit 814 determines the per-LP Perf/EE values to be populated to the capabilities tables 1340 which is updated accordingly.

These Perf/EE values may be overwritten by updates generated from the priority mailbox 1302 (e.g., originating from overclocking software or other forms of software operating at the appropriate privilege level), which may indicate thread-specific parking of one or more cores. In one embodiment, the dynamic core configuration logic 1345 determines the exact set of cores to be parked and/or contained based on the various inputs (e.g., the hints described above) and creates a compressed bitmap of overrides in accordance with the class coding 1401 (i.e., indicating the specific LP # and class to be updated based on the encoding).

The various techniques described above may be implemented (a) in P-code executed by one or more of the power management units (P-units), such as P-unit 2030; (b) using a combination of P-code and driver/kernel code (executed on a core); (c) in hardware; or (d) a combination of P-code, driver/kernel code, and hardware.

In one embodiment, the OS performs classifications of active workloads on the per-application level, averaging multiple seconds. These classifications are not directly tied to the dynamic hints generated by the dynamic core configuration logic 1345 or other processor entities.

As mentioned, the guide unit 814 determines per core capabilities (Perf/EE) at a class level granularity, as reflected in the Perf/EE data 854, using various factors such as the voltage/frequency curve, thermal data, core types, and the current operating point. These per core capabilities are exposed as hints to the OS at 16 ms intervals via the LP capabilities table(s) 1340 (aka, HFI table).

In one embodiment, the utilization and scalability associated with the cores is monitored at a significantly higher granularity than the speed at which hints are provided to the OS (e.g., 1 ms granularity compared to 16 ms for hints). In particular, core threshold detection logic detects when specified utilization thresholds are crossed within each 16 ms interval. In response, one or more predefined exception patterns are detected (e.g., multi-threaded, low utilization, bursty, etc) in view of variables such as the frequency budget and WLT classifications.

In one implementation, specified thresholds are applied to determine if the current core count is in a desired range for the utilization and system scenario (e.g., such as bursty, battery life, sustain, and idle). If the core count is not within the desired range, recommended updates are generated which gradually provide hints based on the appropriate utilization level, along with the reasons associated with the hints. Operation may be scaled up or down at 16 ms intervals while keeping track of system scenarios and utilization targets.

Because reasons are provided along with the hints, the scheduler 810 learns when the parking/consolidation hint is done for PnP. As mentioned, the scheduler 810 may ignore hints when the running application needs multithreaded operation, even if it is at low utilization. This added communication to the scheduler 810 ensures that PnP will not be impacted for specific types of applications that behave differently. The exception will be a combination of utilization levels, workload types, and system frequency.

In one embodiment, a new "reason" bit is added to indicate that the parking hint is for PnP reasons. The scheduler 810 may then use this parking reason, for example, to ignore the hints for certain types of applications (e.g., such as the multithreaded applications required to run at low utilization levels).

Apparatus and Method for Temperature-Constrained Frequency Control and Scheduling With hybrid processor architectures, efficient scheduling is critical for compute performance. Existing scheduling techniques deliver reasonable performance on highly threaded, high load applications. In a processor such as a system-on-chip (SoC) with homogenous cores, temperature information collected by the processor can be exploited to optimize performance because cooler cores can generally achieve improved performance over warmer cores from the perspective of temperature constraints. However, for SoCs with hybrid processor cores, considering only core temperatures to determine which core can provide the best performance can lead to inefficient decisions and lower performance.

Embodiments of the invention include techniques for determining temperature-constrained performance capabilities of processor cores and communicating this information to a scheduler (e.g., an OS scheduler) to be used for performance-based workload scheduling. Temperature-based performance capability variations of the different types of cores exist for various reasons such as variations in manufacturing as well as the thermal characteristics of each workload. Some embodiments of the invention are configured to perform workload scheduling in view of these core/workload characteristics to make more efficient scheduling choices in response to temperature measurements.

Figure 15:
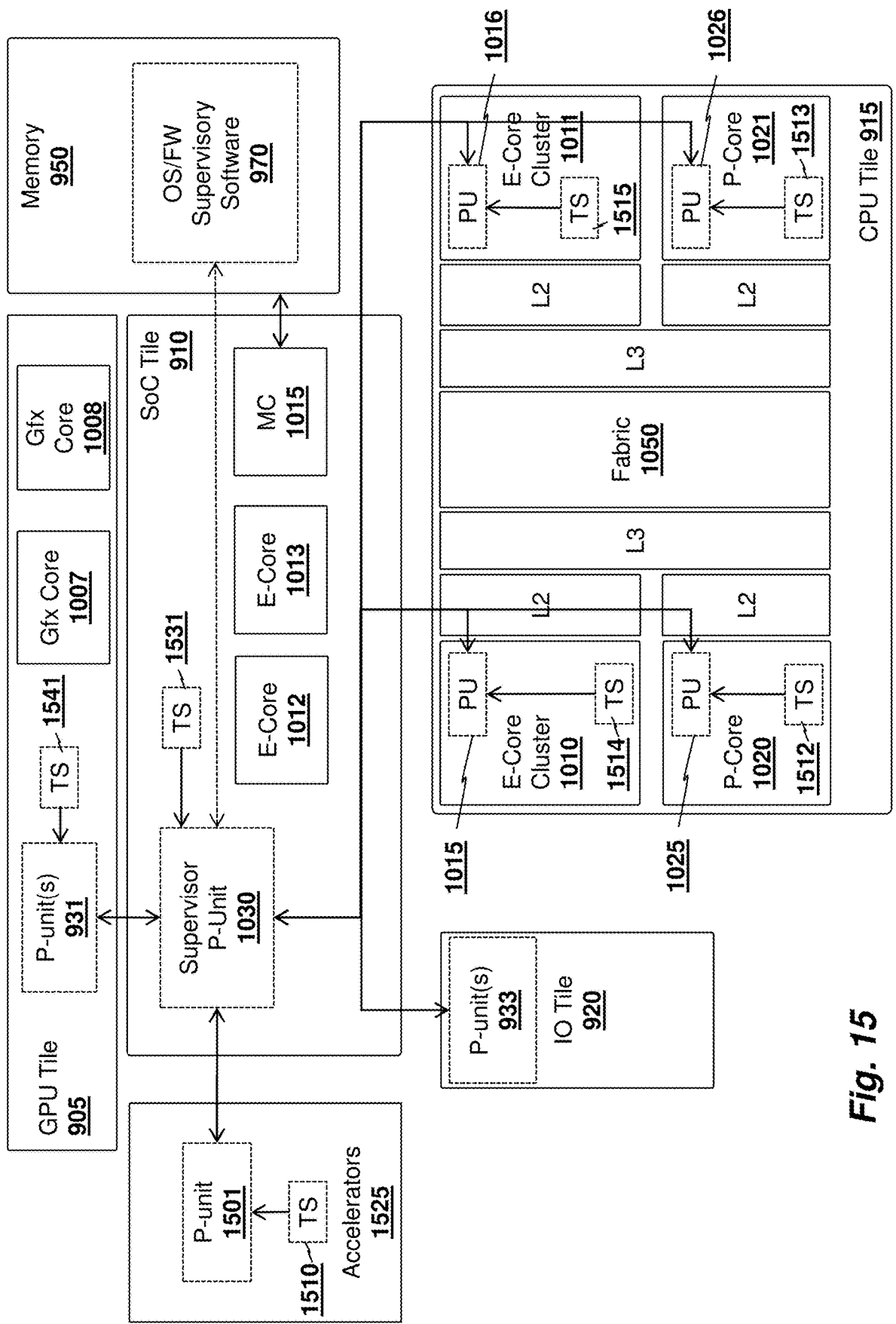
FIG. 15 illustrates an arrangement of temperature sensors in accordance with some embodiments.

FIG. 15 illustrates an example SoC in which temperature sensors 1512-1513 associated with each P-core 1020-1021 and temperature sensors 1514-1515 associated with each E-core cluster 1010-1011, respectively, report temperature measurements to a corresponding local P-unit 1025-1026, 1015-1016. The local P-units 1025-1026, 1015-1016 may dynamically adjust local power consumption based on the temperature measurements and/or pass the temperature measurements to a supervisor P-unit 1030 (previously described with respect to FIG. 10) which makes package-wide power management decisions based, at least in part, on the temperature measurements.

Similarly, a temperature sensor 1541 associated with GPU tile 905 reports temperature readings to local P-unit 931 and a temperature sensor 1551 associated with the accelerators 1525 reports its temperature readings to local P-unit 1501. Both P-units 931, 1501 may dynamically adjust local power consumption based on these measurements and/or send the temperature measurements to the supervisor P-unit 1030 for package-wide power management decisions. In the illustrated example, a temperature sensor 1561 on the SoC tile 910 reports temperature measurements directly to the supervisor P-unit.

It should be noted, however, that the underlying principles of the invention are not limited to a disaggregated architecture or the particular disaggregated architecture illustrated in FIG. 15. Moreover, a hierarchical power management subsystem (e.g., with a supervisor P-unit and a plurality of local P-units) is not required for complying with the embodiments of the invention described herein.

For SoCs with hybrid processor cores, consideration of core temperatures alone for core selection can lead to ineffective decisions. Embodiments of the invention consider additional thermal and performance characteristics of each core or other IP block before making a task scheduling or migration decision-instead of simply deciding based on current temperature and thermal limits. The different thermal and performance characteristics of the different core types may be a result of the fabrication process used to produce the cores, the underlying core architectures, production variability, and potentially other variables. In some cases, the performance of a core in response to changes in thermal conditions is linked to the power specifications of the processor in which the core resides. For example, certain types of cores are capable of maintaining a defined maximum frequency at relatively higher temperatures when they are included in processors with relatively larger power specifications (e.g., 45 W processor as opposed to a 15 W processor).

By way of example, and not limitation, a first type of core ("type 1" core) may provide higher achievable performance (frequency) than a second type of core ("type 2" core), but it has an additional leakage/power cost. As a result, the type 1 core can become less performant than the type 2 core under certain power/thermally constrained scenarios and/or in processors with different base power specifications. Because the thermal characteristics and the maximum performance capabilities of these types of cores differ, it is important to evaluate these factors when making task scheduling and migration decisions (rather simply deciding based on current temperature and thermal limits). In some embodiments described herein, the type 1 cores are ULT cores and the type 2 cores are XLT cores; however, the underlying principles of the invention are not limited to these specific core types.

Embodiments of the invention consider the above variables before scheduling or migrating tasks. In one implementation, when the type 1 core is integrated in a processor with a particular base power value (e.g., a SKU with a 45 W base power specification), a type 1 core can still achieve a higher performance for certain workloads than a type 2 core even after hitting its transistor junction temperature (Tjmax) limit. However, when the type 1 core is integrated in a processor with a second, lower base power value (e.g., a SKU with, for example, a 28 W or 15 W base power specification), the type 1 core becomes less performing after hitting its Tjmax limit compared to a type 2 core under the same workloads.

In one embodiment, the temperature-constrained frequency of a core at its temperature limit is initially predicted. The performance of the core is then dynamically updated based on detected temperature changes and the core's resolved temperature-constrained frequency. This information is then provided to the scheduler so that it can optimally schedule tasks.

The temperature-constrained frequency of a core is dependent on many factors ranging from transistor layer to system cooling solutions. For example, transistors with different voltage/frequency characteristics can yield different temperature-constrained performance when operating at temperature limits. Mounting the same processor/SoC to systems with different cooling solution can also result in different temperature-constrained performance. In addition, workloads with different thermal characteristics will sometimes cause the processor/SoC to have different temperature-constrained performance.

Various techniques may be used to determine temperature-constrained frequencies. For example, one embodiment uses a constant value defined through offline calibration. Alternatively, or in addition, to accommodate the variation on the platform level, some embodiments define a set of choices associated with different platform configurations and choose one based on platform input at runtime. Alternatively, or additionally, the implementations described below perform runtime learning operations to predict the temperature-constrained frequency of a core based on observations of the behavior of the cores at runtime.

Figure 16:
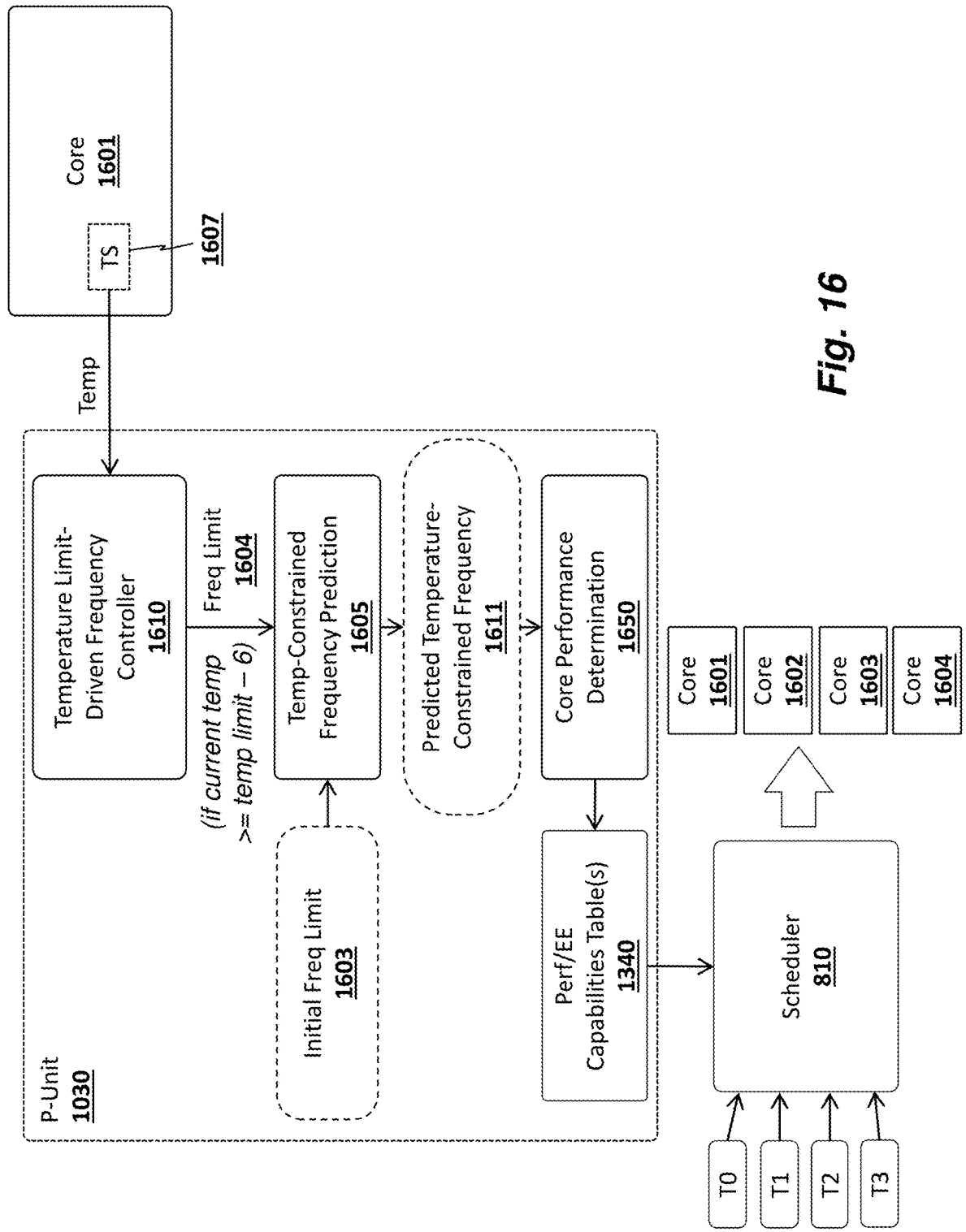
FIG. 16 illustrates one embodiment including a temperature-limit driven frequency controller.

Some specific examples below implement runtime prediction which optimizes core selection since the prediction is made based on actual system/processor characteristics during runtime. FIG. 16 illustrates an embodiment in which a temperature limit-driven frequency controller 1610 of a power management unit (P-unit) 1030 determines a temperature-constrained frequency 1604 of a core 1601 based on measurements made by a temperature sensor 1607 associated with the core 1601. The core 1601 may be any type of IP block including, but not limited to, those illustrated in FIG. 15, i.e., a graphics core 1007, an accelerator core 1525 (e.g., a VPU or IPU core), an E-core 1012-1013, 1010-1011, or a P-core 1020-1021.

In one embodiment, the following sequence of operations are performed to predict the temperature-constrained frequency of the core 1601. First, the P-unit 1030 monitors the temperature provided by the temperature sensor 1607 (and potentially other temperature sensors) and tracks the frequency of the core 1601 due to its temperature constraints. In FIG. 16, if the current temperature measurement indicates a temperature above a specified threshold (e.g., >=temp limit-6 in the example) then the temperature limit-driven frequency controller 1610 specifies a corresponding frequency limit 1604.

In one embodiment, temperature-constrained frequency prediction logic 1605 dynamically generates a predicted temperature-constrained frequency 1611 based on the frequency limit 1604 and the initial frequency limit 1603 (i.e., the starting frequency limit for the current iteration). For example, the initial frequency limit 1603 may be the previous frequency limit, set when the core temperature was higher or lower than the current temperature. By way of example, the initial frequency may be set when the core's temperature reached or exceeded (temperature limit-1).

In one embodiment, core performance determination logic 1650 uses the predicted temperature-constrained frequency 1611 to determine a performance value for the core. In some implementations, the performance value may be stored in the perf/EE capabilities table 1340 (e.g., the HFI table) which lists the performance values for the various cores or logical processors (which represent entire cores or portions of cores). For example, the updated performance value may be provided as one of the inputs to the dynamic core configuration hardware logic 1345 described above.

Once in the capabilities table(s) 1340, the updated performance value may then be provided to the scheduler 810 as it makes scheduling decisions when scheduling tasks/ threads on the plurality of processor cores 1601-1604 (or the individual LPs associated with each of the processor cores 1601-1604). While only four cores 1601-1604 are shown for simplicity, the scheduler 810 may schedule work on a larger number and a wider variety of cores using the techniques described herein.

In one embodiment, the frequency prediction logic 1605 uses an exponentially-weighted moving average to predict the new temperature-constrained frequency limit 1611. For example, an exponentially-weighted moving average can be used to distinguish circumstances when the core temperature is rising from those when the temperature is dropping using combinations of the frequency limit 1604 and the initial frequency limit 1603. Note, however, that the underlying principles of the invention are not limited to any particular averaging technique. The predicted temperature-constrained frequency limit 1611 is sometimes referred to herein as the predicted saturated frequency, or $F_{sat}$.

In one embodiment, the performance specifications for the core 1601 are dynamically updated based on temperature changes. Assuming that the predicted saturated frequency 1610 is resolved as described above, FIG. 17 illustrates one embodiment in which the performance capability of a core is updated based on its corresponding temperature change, as indicated by 1750-1752. The HFI interface (as described above) or a different mechanism is used to notify the scheduler 810 of the updated performance capabilities. For example, the Perf values corresponding to the cores/LPs may be updated in the capabilities table 1340. In one implementation, a core's performance is determined using Frequency×Instruction-Per-Cycle (IPC).

Figure 17:
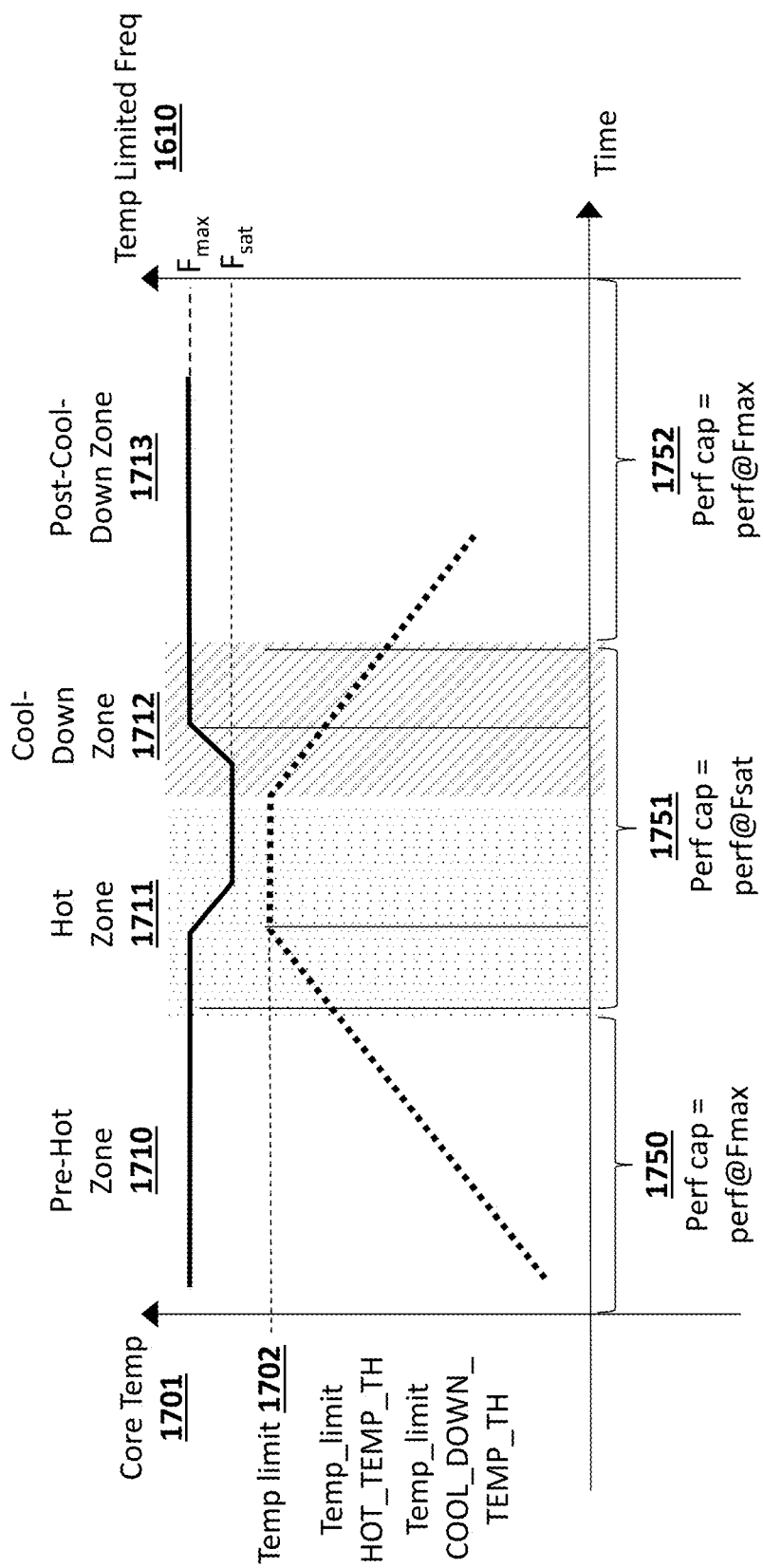
FIG. 17 illustrates an example of relationships between core frequency and temperature over time in some embodiments.

The core temp 1701 in FIG. 17 is represented as the dotted line spanning a pre-hot zone 1710, a hot zone 1711, a cool-down zone 1712, and a post-cool-down zone 1713. The corresponding temperature limited frequency 1610 is represented by the solid line. As illustrated in FIG. 17, the performance capability of a core is updated as its temperature changes.

While this specific example uses 4 zones, the underlying principles of the invention are not limited to this particular set of zones. Different numbers of zones can be used under different implementations.

Pre-Hot Zone 1710: This is a zone where there is still sufficient thermal headroom before the core reaches its temperature limit 1702. Because of this, in this zone 1710, the core's temperature limited frequency 1610 is the core's maximum frequency ($F_{max}$). The performance of the core within the pre-hot zone 1710 is determined based on this maximum frequency.

Hot Zone 1711: This is a zone where the core temperature is increasing and there is only limited time before the core reaches its temperature limit 1702. Given that the OS could take time to observe the change, when the temperature of the core enters the hot zone 1711, the resolved temperature-constrained frequency, $F_{sat}$, is used to determine the performance of the core (perf cap=perf@$F_{sat}$ as indicated at 1751). Note that the temperature threshold, denoted as HOT_TEMP_TH, can be different for different systems. For example, it may be set to 0 in some implementations in which the OS is capable of observing the change and responding in a sufficiently small amount of time.

Cool-down Zone 1712: This zone is entered when the core's temperature begins decreasing after peaking at its temperature limit 1702. In this zone, some implementations continue to use $F_{sat}$ to calculate the performance (indicated at 1751) to avoid unnecessary oscillations.

Post-cool-down Zone: This zone is entered when a low temperature threshold is reached (COOL_DOWN_TEMP_TH). At this stage, there is a sufficient amount of thermal headroom available to increase the core's maximum frequency to $F_{max}$ when determining the core's performance (perf cap=perf@$F_{max}$, as indicated at 1752).

These embodiments can be used to achieve optimal task scheduling in different systems. For example, FIGS. 18A-B illustrate the operation of embodiments of the invention on processors with different power/thermal specifications. As shown in FIG. 18A, on a processor with a base power specification at or above a defined threshold (e.g., a 45 W SKU), a type 1 core 1801 will always achieve higher performance than a type 2 core 1802 (i.e., running at 5.5 GHZ while the type 2 core runs at 5.3 GHZ). Consequently, threads of task 1801 are not migrated to the type 2 core 1802, even when the type 1 core 1801 reaches its maximum frequency limit after breaching Tjmax.

In contrast, as shown in FIG. 18B, on a processor with a base power specification at or below another threshold (e.g., a 15 W or 28 W SKU), the performance of the type 1 core 1801 will drop below that of the type 2 core after crossing Tjmax (e.g., 5.15 GHz compared to 5.3 GHZ). As such, in this implementation, the threads of task 1801 are migrated to the type 2 core when the temperature of the type 1 core 1801 reaches the specified hot zone limit. When the type 1 core crosses Tjmax, its maximum frequency limit drops to 5.15 GHz while the maximum frequency limit of the type 2 core remains at 5.3 GHZ. The differences between FIG. 18A and FIG. 35B result from understanding the differences in the behavior of the type 1 cores on the two different processors (e.g., the differences in the $F_{sat}$ values for each processor).

Figure 19:
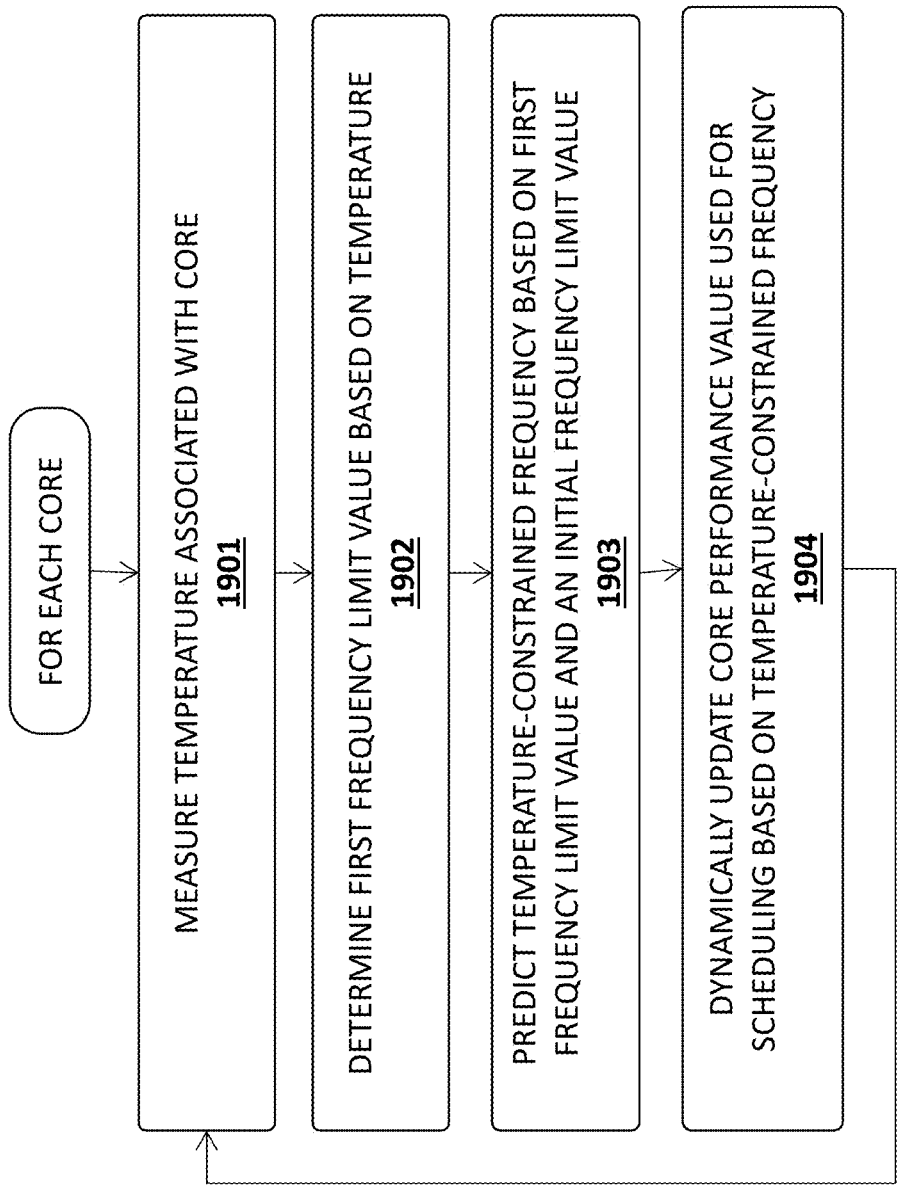
FIG. 19 illustrates a method in accordance with some embodiments.

FIG. 19 illustrates a method in accordance with one embodiment of the invention. The illustrated method may be implemented within the various architectures described herein, but is not limited to any particular processor or system architecture.

At 1901, for each core, a temperature associated with the core is measured. At 1902, a frequency limit is determined based on the measured temperature. At 1903, a temperature-constrained frequency is predicted based on the first frequency limit and an initial frequency limit value (e.g., the previously-determined frequency limit value). At 1904, the performance value associated with the core is dynamically updated based on the temperature-constrained frequency. For example, an HFI table may be updated and shared with a scheduler to indicate a new performance value for the core.

These embodiments of the invention have been shown to result in a 5% improvement on benchmarks hovering around thermal limits. In some embodiments, the temperature constrained frequency determination is performed by firmware and sent to the OS periodically (e.g., via updates to the capabilities table(s) 1340).

EXAMPLES

The following are example implementations of different embodiments of the invention.

Example 1. A processor comprising: a plurality of cores; power management circuitry to control a frequency of each core of the plurality of cores based, at least in part, on a temperature associated with one or more cores of the plurality of cores, the power management circuitry comprising: a temperature limit-driven frequency controller to determine a first frequency limit value based on a temperature of a corresponding core reaching a first threshold; frequency prediction hardware logic to predict a temperature-constrained frequency of the corresponding core based on the first frequency limit value and an initial frequency limit value; and performance determination hardware logic to determine a new performance value for the corresponding core based on the temperature-constrained frequency, the new performance value to be provided to a scheduler.

2. The processor of example 1 wherein the new performance value is to be stored in a data structure comprising a plurality of performance values, each performance value associated with a core of the plurality of cores or an associated one or more logical processors (LPs), the data structure accessible to the scheduler to determine performance of each core of the plurality of cores across one or more temperature thresholds.

Example 3. The processor of example 2 further comprising: dynamic core configuration hardware logic to update the data structure responsive to receiving the new performance value and further in response to one or more energy/performance hints.

Example 4. The processor of examples 2 or 3 wherein the one or more temperature thresholds comprise a first temperature threshold at which temperature of the corresponding core is increasing, the first temperature threshold separating a first zone and a second zone, a temperature of the corresponding core higher in the second zone than in the first zone, wherein in the second zone, the temperature limit-driven frequency controller is to determine the first frequency limit value based on the temperature of the corresponding core and the performance determination hardware logic is to determine the new performance value.

Example 5. The processor of any of examples 1-4 wherein the corresponding core is a first core of a first core type, the plurality of cores including a second core of a second core type, the first core associated with a higher performance than the second core at any temperature if the processor has a first power specification and the second core associated with a higher performance than the first core at temperatures above a specified threshold value if the processor has a second power specification.

Example 6. The processor of example 5 wherein the new performance value is a first performance value when the processor is associated with the first power specification and is a second performance value when the processor is associated with the second power specification.

Example 7. The processor of example 6 wherein the first and second power specifications comprise first and second base power values or thermal design power (TDP) values.

Example 8. The processor of example 6 or 7 wherein the first base power value comprises a base power value of at least 45 W and the second base power value comprises a base power value less than 45 W.

Example 9. A method comprising: controlling a frequency of each core of a plurality of cores based, at least in part, on a temperature associated with one or more cores of the plurality of cores; determining a first frequency limit value based on a temperature of a corresponding core reaching a first threshold; predicting a temperature-constrained frequency of the corresponding core based on the first frequency limit value and an initial frequency limit value; and determining a new performance value for the corresponding core based on the temperature-constrained frequency, the new performance value to be provided to a scheduler.

Example 10. The method of example 9 wherein the new performance value is to be stored in a data structure comprising a plurality of performance values, each performance value associated with a core of the plurality of cores or an associated one or more logical processors (LPs), the data structure accessible to the scheduler to determine performance of each core of the plurality of cores across one or more temperature thresholds.

11. The method of example 10 further comprising: updating the data structure responsive to receiving the new performance value and further in response to one or more energy/performance hints.

Example 12. The method of examples 10 or 11 wherein the one or more temperature thresholds comprise a first temperature threshold at which temperature of the corresponding core is increasing, the first temperature threshold separating a first zone and a second zone, a temperature of the corresponding core higher in the second zone than in the first zone, wherein in the second zone, the temperature limit-driven frequency controller is to determine the first frequency limit value based on the temperature of the corresponding core and the performance determination hardware logic is to determine the new performance value.

Example 13. The method of any of examples 9-12 wherein the corresponding core is a first core of a first core type, the plurality of cores including a second core of a second core type, the first core associated with a higher performance than the second core at any temperature if a processor of the first core has a first power specification and the second core associated with a higher performance than the first core at temperatures above a specified threshold value if the processor has a second power specification.

Example 14. The method of example 13 wherein the new performance value is a first performance value when the processor is associated with the first power specification and is a second performance value when the processor is associated with the second power specification.

Example 15. The method of example 14 wherein the first and second power specifications comprise first and second base power values or thermal design power (TDP) values.

Example 16. The method of examples 14 or 15 wherein the first base power value comprises a base power value of at least 45 W and the second base power value comprises a base power value less than 45 W.

Example 17. A machine-readable medium having program code stored thereon which, when executed by a machine, causes the machine to perform the operations of: controlling a frequency of each core of a plurality of cores based, at least in part, on a temperature associated with one or more cores of the plurality of cores; determining a first frequency limit value based on a temperature of a corresponding core reaching a first threshold; predicting a temperature-constrained frequency of the corresponding core based on the first frequency limit value and an initial frequency limit value; and determining a new performance value for the corresponding core based on the temperature-constrained frequency, the new performance value to be provided to a scheduler.

Example 18. The machine-readable medium of example 17 wherein the new performance value to is to be stored in a data structure comprising a plurality of performance values, each performance value associated with a core of the plurality of cores or an associated one or more logical processors (LPs), the data structure accessible to the scheduler to determine a performance of each core of the plurality of cores across one or more temperature thresholds.

Example 19. The machine-readable medium of example 18 further comprising program code to cause the machine to perform the operations of: updating the data structure responsive to receiving the new performance value and further in response to one or more energy/performance hints.

Example 20. The machine-readable medium of example 18 or 19 wherein the one or more temperature thresholds comprise a first temperature threshold at which temperature of the corresponding core is increasing, the first temperature threshold separating a first zone and a second zone, a temperature of the corresponding core higher in the second zone than in the first zone, wherein in the second zone, the temperature limit-driven frequency controller is to determine the first frequency limit value based on the temperature of the corresponding core and the performance determination hardware logic is to determine the new performance value.

Example 21. The machine-readable medium of any of examples 17-20 wherein the corresponding core is a first core of a first core type, the plurality of cores including a second core of a second core type, the first core associated with a higher performance than the second core at any temperature if a processor of the first core has a first power specification and the second core associated with a higher performance than the first core at temperatures above a specified threshold value if the processor has a second power specification.

Example 22. The machine-readable medium of example 21 wherein the new performance value is a first performance value when the processor is associated with the first power specification and is a second performance value when the processor is associated with the second power specification.

Example 23. The machine-readable medium of example 22 wherein the first and second power specifications comprise first and second base power values or thermal design power (TDP) values.

Example 24. The machine-readable medium of examples 22 or 23 wherein the first base power value comprises a base power value of at least 45 W and the second base power value comprises a base power value less than 45 W.

Example 25. An apparatus comprising: means for controlling a frequency of each core of a plurality of cores based, at least in part, on a temperature associated with one or more cores of the plurality of cores; means for determining a first frequency limit value based on a temperature of a corresponding core reaching a first threshold; means for predicting a temperature-constrained frequency of the corresponding core based on the first frequency limit value and an initial frequency limit value; and means for determining a new performance value for the corresponding core based on the temperature-constrained frequency, the new performance value to be provided to a scheduler.

Example 26. The apparatus of example 25 wherein the new performance value is to be stored in a data structure comprising a plurality of performance values, each performance value associated with a core of the plurality of cores or an associated one or more logical processors (LPs), the data structure accessible to the scheduler to determine performance of each core of the plurality of cores across one or more temperature thresholds.

Example 27. The apparatus of example 26 further comprising: means for updating the data structure responsive to receiving the new performance value and further in response to one or more energy/performance hints.

Example 28. The apparatus of examples 26 or 27 wherein the one or more temperature thresholds comprise a first temperature threshold at which temperature of the corresponding core is increasing, the first temperature threshold separating a first zone and a second zone, a temperature of the corresponding core higher in the second zone than in the first zone, wherein in the second zone, the temperature limit-driven frequency controller is to determine the first frequency limit value based on the temperature of the corresponding core and the performance determination hardware logic is to determine the new performance value.

Example 29. The apparatus of any of examples 25-28 wherein the corresponding core is a first core of a first core type, the plurality of cores including a second core of a second core type, the first core associated with a higher performance than the second core at any temperature if a processor of the first core has a first power specification and the second core associated with a higher performance than the first core at temperatures above a specified threshold value if the processor has a second power specification.

Example 30. The apparatus of example 29 wherein the new performance value is a first performance value when the processor is associated with the first power specification and is a second performance value when the processor is associated with the second power specification.

Example 31. The apparatus of example 30 wherein the first and second power specifications comprise first and second base power values or thermal design power (TDP) values.

Example 32. The apparatus of examples 30 or 31 wherein the first base power value comprises a base power value of at least 45 W and the second base power value comprises a base power value less than 45 W.

Example 33. A system comprising: a memory controller to couple to a system memory; an input-output (IO) interface to couple to one or more IO devices; a plurality of cores coupled to the memory controller and the IO interface; and power management circuitry to control a frequency of each core of the plurality of cores based, at least in part, on a temperature associated with one or more cores of the plurality of cores, the power management circuitry comprising: a temperature limit-driven frequency controller to determine a first frequency limit value based on a temperature of a corresponding core reaching a first threshold; frequency prediction hardware logic to predict a temperature-constrained frequency of the corresponding core based on the first frequency limit value and an initial frequency limit value; and performance determination hardware logic to determine a new performance value for the corresponding core based on the temperature-constrained frequency, the new performance value to be provided to a scheduler.

Example 34. The system of example 33 further comprising: an accelerator to perform operations responsive to the plurality of cores.

Example 35. The system of example 33 wherein a first subset of the plurality of cores are integral to a first semiconductor chip, a second subset of the plurality of cores are integral to a second semiconductor chip, and the IO interface and memory controller are integral to a third semiconductor chip.

Example 36. The system of example 35 wherein the power management circuitry comprises a plurality of interconnected power management units, including a first power management unit integral to the first semiconductor chip, a second power management unit integral to the second semiconductor chip, and a third power management unit integral to the third semiconductor chip.

Example 37. The system of example 36 further comprising: an interconnect fabric to communicatively couple the first, second, and third power management units.

Example 38. The system of example 36 wherein at least one of the first, second, and third power management units comprises the temperature limit-driven frequency controller, the frequency prediction hardware logic, and the performance determination hardware logic.

In the foregoing specification, the embodiments of invention have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals-such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
   a plurality of cores;
   power management circuitry to control a frequency of each core of the plurality of cores based, at least in part, on a temperature associated with one or more cores of the plurality of cores, the power management circuitry comprising:
   a temperature limit-driven frequency controller to determine a first frequency limit value based on a temperature of a corresponding core reaching a first threshold;
   frequency prediction hardware logic to predict a temperature-constrained frequency of the corresponding core based on the first frequency limit value and an initial frequency limit value; and
   performance determination hardware logic to determine a new performance value for the corresponding core based on the temperature-constrained frequency, the new performance value to be provided to a scheduler.

2. The processor of claim 1 wherein the new performance value to is to be stored in a data structure comprising a plurality of performance values, each performance value associated with a core of the plurality of cores or an associated one or more logical processors (LPs), the data structure accessible to the scheduler to determine a performance of each core of the plurality of cores across one or more temperature thresholds.

3. The processor of claim 2 further comprising:
   dynamic core configuration hardware logic to update the data structure responsive to receiving the new performance value and further in response to one or more energy/performance hints.

4. The processor of claim 2 wherein the one or more temperature thresholds comprise a first temperature threshold at which temperature of the corresponding core is increasing, the first temperature threshold separating a first zone and a second zone, a temperature of the corresponding core higher in the second zone than in the first zone, wherein in the second zone, the temperature limit-driven frequency controller is to determine the first frequency limit value based on the temperature of the corresponding core and the performance determination hardware logic is to determine the new performance value.

5. The processor of claim 1 wherein the corresponding core is a first core of a first core type, the plurality of cores including a second core of a second core type, the first core associated with a higher performance than the second core at any temperature if the processor has a first power specification and the second core associated with a higher performance than the first core at temperatures above a specified threshold value if the processor has a second power specification.

6. The processor of claim 5 wherein the new performance value is a first performance value when the processor is associated with the first power specification and is a second performance value when the processor is associated with the second power specification.

7. The processor of claim 6 wherein the first and second power specifications comprise first and second base power values or thermal design power (TDP) values.

8. The processor of claim 6 wherein the first base power value comprises a base power value of at least 45 W and the second base power value comprises a base power value less than 45 W.

9. A method comprising:
   controlling a frequency of each core of a plurality of cores based, at least in part, on a temperature associated with one or more cores of the plurality of cores;

determining a first frequency limit value based on a temperature of a corresponding core reaching a first threshold;
predicting a temperature-constrained frequency of the corresponding core based on the first frequency limit value and an initial frequency limit value; and
determining a new performance value for the corresponding core based on the temperature-constrained frequency, the new performance value to be provided to a scheduler.

10. The method of claim 9 wherein the new performance value to is to be stored in a data structure comprising a plurality of performance values, each performance value associated with a core of the plurality of cores or an associated one or more logical processors (LPs), the data structure accessible to the scheduler to determine a performance of each core of the plurality of cores across one or more temperature thresholds.

11. The method of claim 10 further comprising:
updating the data structure responsive to receiving the new performance value and further in response to one or more energy/performance hints.

12. The method of claim 11 wherein the one or more temperature thresholds comprise a first temperature threshold at which temperature of the corresponding core is increasing, the first temperature threshold separating a first zone and a second zone, a temperature of the corresponding core higher in the second zone than in the first zone, wherein in the second zone, the temperature limit-driven frequency controller is to determine the first frequency limit value based on the temperature of the corresponding core and the performance determination hardware logic is to determine the new performance value.

13. The method of claim 9 wherein the corresponding core is a first core of a first core type, the plurality of cores including a second core of a second core type, the first core associated with a higher performance than the second core at any temperature if a processor of the first core has a first power specification and the second core associated with a higher performance than the first core at temperatures above a specified threshold value if the processor has a second power specification.

14. The method of claim 13 wherein the new performance value is a first performance value when the processor is associated with the first power specification and is a second performance value when the processor is associated with the second power specification.

15. The method of claim 14 wherein the first and second power specifications comprise first and second base power values or thermal design power (TDP) values.

16. The method of claim 14 wherein the first base power value comprises a base power value of at least 45 W and the second base power value comprises a base power value less than 45 W.

17. A non-transitory machine-readable medium having program code stored thereon which, when executed by a machine, causes the machine to perform the operations of:
controlling a frequency of each core of a plurality of cores based, at least in part, on a temperature associated with one or more cores of the plurality of cores;
determining a first frequency limit value based on a temperature of a corresponding core reaching a first threshold;
predicting a temperature-constrained frequency of the corresponding core based on the first frequency limit value and an initial frequency limit value; and
determining a new performance value for the corresponding core based on the temperature-constrained frequency, the new performance value to be provided to a scheduler.

18. The non-transitory machine-readable medium of claim 17 wherein the new performance value to is to be stored in a data structure comprising a plurality of performance values, each performance value associated with a core of the plurality of cores or an associated one or more logical processors (LPs), the data structure accessible to the scheduler to determine a performance of each core of the plurality of cores across one or more temperature thresholds.

19. The non-transitory machine-readable medium of claim 18 further comprising program code to cause the machine to perform the operations of:
updating the data structure responsive to receiving the new performance value and further in response to one or more energy/performance hints.

20. The non-transitory machine-readable medium of claim 19 wherein the one or more temperature thresholds comprise a first temperature threshold at which temperature of the corresponding core is increasing, the first temperature threshold separating a first zone and a second zone, a temperature of the corresponding core higher in the second zone than in the first zone, wherein in the second zone, the temperature limit-driven frequency controller is to determine the first frequency limit value based on the temperature of the corresponding core and the performance determination hardware logic is to determine the new performance value.

21. The non-transitory machine-readable medium of claim 17 wherein the corresponding core is a first core of a first core type, the plurality of cores including a second core of a second core type, the first core associated with a higher performance than the second core at any temperature if a processor of the first core has a first power specification and the second core associated with a higher performance than the first core at temperatures above a specified threshold value if the processor has a second power specification.

22. The non-transitory machine-readable medium of claim 21 wherein the new performance value is a first performance value when the processor is associated with the first power specification and is a second performance value when the processor is associated with the second power specification.

23. The non-transitory machine-readable medium of claim 22 wherein the first and second power specifications comprise first and second base power values or thermal design power (TDP) values.

24. The non-transitory machine-readable medium of claim 23 wherein the first base power value comprises a base power value of at least 45 W and the second base power value comprises a base power value less than 45 W.

\* \* \* \* \*